United States Patent
Ahammad

(10) Patent No.: US 10,015,503 B1
(45) Date of Patent: Jul. 3, 2018

(54) FAST, REAL-TIME, ESTIMATION OF CONTENT-SENSITIVE ENCODING QUALITY FOR OPTIMIZED WEB DELIVERY OF IMAGES

(71) Applicant: Instart Logic, Inc., Palo Alto, CA (US)

(72) Inventor: Parvez Ahammad, San Jose, CA (US)

(73) Assignee: Instart Logic, Inc., Palo Alto, CA (US)

( * ) Notice: Subject to any disclaimer, the term of this patent is extended or adjusted under 35 U.S.C. 154(b) by 0 days.

(21) Appl. No.: 15/270,956

(22) Filed: Sep. 20, 2016

Related U.S. Application Data

(60) Provisional application No. 62/232,307, filed on Sep. 24, 2015.

(51) Int. Cl.
| | |
|---|---|
| *H04N 19/426* | (2014.01) |
| *H04N 5/93* | (2006.01) |
| *G06T 7/00* | (2017.01) |
| *G06K 9/62* | (2006.01) |
| *H04N 19/154* | (2014.01) |
| *G06T 3/40* | (2006.01) |
| *H04L 29/08* | (2006.01) |

(52) U.S. Cl.
CPC ......... *H04N 19/426* (2014.11); *G06K 9/6215* (2013.01); *G06K 9/6218* (2013.01); *G06K 9/6267* (2013.01); *G06T 3/4092* (2013.01); *G06T 7/0002* (2013.01); *H04L 67/06* (2013.01); *H04N 5/9305* (2013.01); *H04N 19/154* (2014.11)

(58) Field of Classification Search
CPC ... G06K 9/6215; G06K 9/6218; G06K 9/6267
See application file for complete search history.

(56) References Cited

U.S. PATENT DOCUMENTS

| | | |
|---|---|---|
| 7,231,082 B2 | 6/2007 | Lenoir |
| 7,647,593 B2 | 1/2010 | Matsumoto |
| 8,452,110 B2 | 5/2013 | Carmel |
| 8,599,432 B2 | 12/2013 | Mestha et al. |
| 8,612,517 B1 | 12/2013 | Yadid et al. |

(Continued)

OTHER PUBLICATIONS

Li et al: "Reduced-Reference Image Quality Assessment Using Divisive Normalization-Based Image Representation", IEEE, 2009.*

(Continued)

*Primary Examiner* — Ruiping Li
(74) *Attorney, Agent, or Firm* — Van Pelt, Yi & James LLP

(57) ABSTRACT

A request for an image is received. A reduced version of the image is generated. A plurality of reduced distorted images is generated, wherein each reduced distorted image is a reduced version of a different distortion applied to the image. A variation of quality signature of the image is determined, wherein the variation of quality signature of the image comprises a plurality of element signatures, and wherein the plurality of element signatures are determined based on the plurality of reduced distorted images. The image is categorized into one of a plurality of clusters of images, wherein the categorization is based on a similarity between the variation of quality signature of the image and one or more other variation of quality signatures of one or more other images within the plurality of clusters of images. A distorted version of the image based on the categorization is delivered.

37 Claims, 17 Drawing Sheets

(56) References Cited

U.S. PATENT DOCUMENTS

| | | | |
|---|---|---|---|
| 8,645,485 | B1 | 2/2014 | Yadid et al. |
| 8,805,109 | B2 | 8/2014 | Carmel |
| 8,908,984 | B2 | 12/2014 | Carmel |
| 2002/0056131 | A1 | 5/2002 | Hayashi et al. |
| 2003/0068100 | A1 | 4/2003 | Covell |
| 2004/0014460 | A1 | 1/2004 | Moroo et al. |
| 2004/0101086 | A1 | 5/2004 | Sabol et al. |
| 2004/0114685 | A1 | 6/2004 | Kouloheris |
| 2004/0249565 | A1 | 12/2004 | Park et al. |
| 2005/0057648 | A1 | 3/2005 | Ambiru et al. |
| 2005/0226252 | A1 | 10/2005 | Tomita |
| 2008/0071877 | A1 | 3/2008 | Beach |
| 2008/0291479 | A1 | 11/2008 | Mestha et al. |
| 2008/0291480 | A1 | 11/2008 | Mestha et al. |
| 2009/0141992 | A1* | 6/2009 | Coulombe .............. G06T 9/004 382/235 |
| 2009/0180555 | A1 | 7/2009 | Sun |
| 2009/0202167 | A1 | 8/2009 | Mujis et al. |
| 2009/0044116 | A1 | 12/2009 | Kitabayashi |
| 2010/0067574 | A1 | 3/2010 | Knicker |
| 2010/0185615 | A1 | 7/2010 | Monga |
| 2010/0202700 | A1 | 8/2010 | Rezazadeh |
| 2010/0316131 | A1 | 12/2010 | Shanableh |
| 2010/0329333 | A1 | 12/2010 | Haskell |
| 2011/0106881 | A1 | 5/2011 | Douville et al. |
| 2011/0228848 | A1 | 9/2011 | Dvir et al. |
| 2011/0246996 | A1 | 10/2011 | Tunning |
| 2011/0258344 | A1 | 10/2011 | Mukherjee et al. |
| 2011/0274361 | A1 | 11/2011 | Bovik |
| 2012/0201475 | A1 | 8/2012 | Carmel et al. |
| 2012/0229655 | A1 | 9/2012 | Solomon |
| 2013/0257883 | A1 | 10/2013 | Krig et al. |
| 2014/0241629 | A1 | 8/2014 | Lerios et al. |
| 2015/0030237 | A1 | 1/2015 | Jancsary et al. |
| 2015/0131898 | A1 | 5/2015 | Schelten et al. |

OTHER PUBLICATIONS

Malekmohamadi et al: "Automatic QoE Prediction in Stereoscopic Videos", IEEE, 2012.*

Jain et al., Score Normalization in Multimodal Biometric Systems, Pattern Recognition 38, 2005, pp. 2270-2285.
Author Unknown, Rec. ITU-R, BT.500-11, Recommendation ITU-R BT.500-11, Methodology for Subjective Assessment of the Quality of Television Pictures, 2002.
Chen et al., Image Categorization by Learning and Reasoning with Regions, Journal of Machine Learning Research, 5, 2004, pp. 913-939.
Frey et al., Clustering by Passing Messages Between Data Points, Science vol. 315, Feb. 16, 2007, pp. 972-976.
Ahammad et al., QoE-Driven Unsupervised Image Categorization for Optimized Web Delivery, Aug. 27, 2014.
Hartigan et al., A K-Means Clustering Algorithm, Applied Statistics, 1979, pp. 100-108.
Author Unknown, HTTPArchive, 2014.
Shotton et al., Semantic Texton Forests for Image Categorization and Segmentation, Proceedings of IEEE Conference on Computer Vision and Pattern Recognition (CVPR), 2008.
Hans Marmolin, Subjective MSE Measures, IEEE Transactions on Systems, Man, Cybernetics, vol. SMC-16, No. 3, May/Jun. 1986.
Author Unknown, Media Queries, What is Media Queries, 2014.
Bradley et al., Scaling EM (Expection-Maximization) Clustering to Large Databases, Microsoft Research Technical Report, MSR-TR-98-35, Nov. 1998.
Rauschenbach et al., Adaptive Image Transmission, Proceedings of International Conference in Central Europe, on Computer Graphics and Visualization, (WSCG), Feb. 10-14, 1997, pp. 434-443.
Chandra et al., Differentiated Multimedia Web Services Using Quality Aware Transcoding, Proceedings of the Nineteenth Annual Joint Conference of the IEEE Computer and Communications Societies (INFOCOM), 2000, pp. 361-969.
Tammy Everts, The Average Web Page has Almost Doubled in Size Since 2010, WebPerformanceToday, Jun. 5, 2013.
Wang et al., Image Quality Assessment: From Error Visibility to Structural Similarity, IEEE Transactions on Image Processing, vol. 13, No. 4, Apr. 2004, pp. 600-612.
Ahammad et al., QoE-Driven Unsupervised Image Categorization for Optimized Web Delivery, Apr. 16, 2014.
Richard L. Gregory, Princeton Science Library, Eye and Brain, The Psychology of Seeing, Fifth Edition 1997 ISBN-10: 0-691-04837-1 Entire Book is Being Submitted.

* cited by examiner

400

402

Determine VoQS for the New Image

404

Determine the Nearest Exemplar to the New Image Based on VoQS

406

Determine the Image Quality Threshold for Delivering the New Image Based on the Image Quality Threshold Assigned to the Nearest Exemplar to the New Image

FIG. 4

FAST, REAL-TIME, ESTIMATION OF CONTENT-SENSITIVE ENCODING QUALITY FOR OPTIMIZED WEB DELIVERY OF IMAGES

CROSS REFERENCE TO OTHER APPLICATIONS

This application claims priority to U.S. Provisional Patent Application No. 62/232,307 entitled FAST, REAL-TIME, ESTIMATION OF CONTENT-SENSITIVE ENCODING QUALITY FOR OPTIMIZED WEB DELIVERY OF IMAGES filed Sep. 24, 2015 which is incorporated herein by reference for all purposes.

BACKGROUND OF THE INVENTION

In the present day Internet, websites and web applications are highly dynamic and increasingly rich in content, and a multitude of network devices (e.g., smart phones, laptops, and tablets) may be utilized for accessing websites and web applications. Additionally, the average size of webpages has been steadily increasing, as has the average load time of content-rich websites. Since images represent the most significant portion of data content on a typical webpage, improved techniques for delivering images to the multitude of user devices in a manner that maximizes the Quality of Experience (QoE) for the users would be desirable.

BRIEF DESCRIPTION OF THE DRAWINGS

Various embodiments of the invention are disclosed in the following detailed description and the accompanying drawings.

FIG. 4 illustrates an embodiment of a process 400 for the online process for efficient delivery of images to end-user devices.

DETAILED DESCRIPTION

Figure 1:
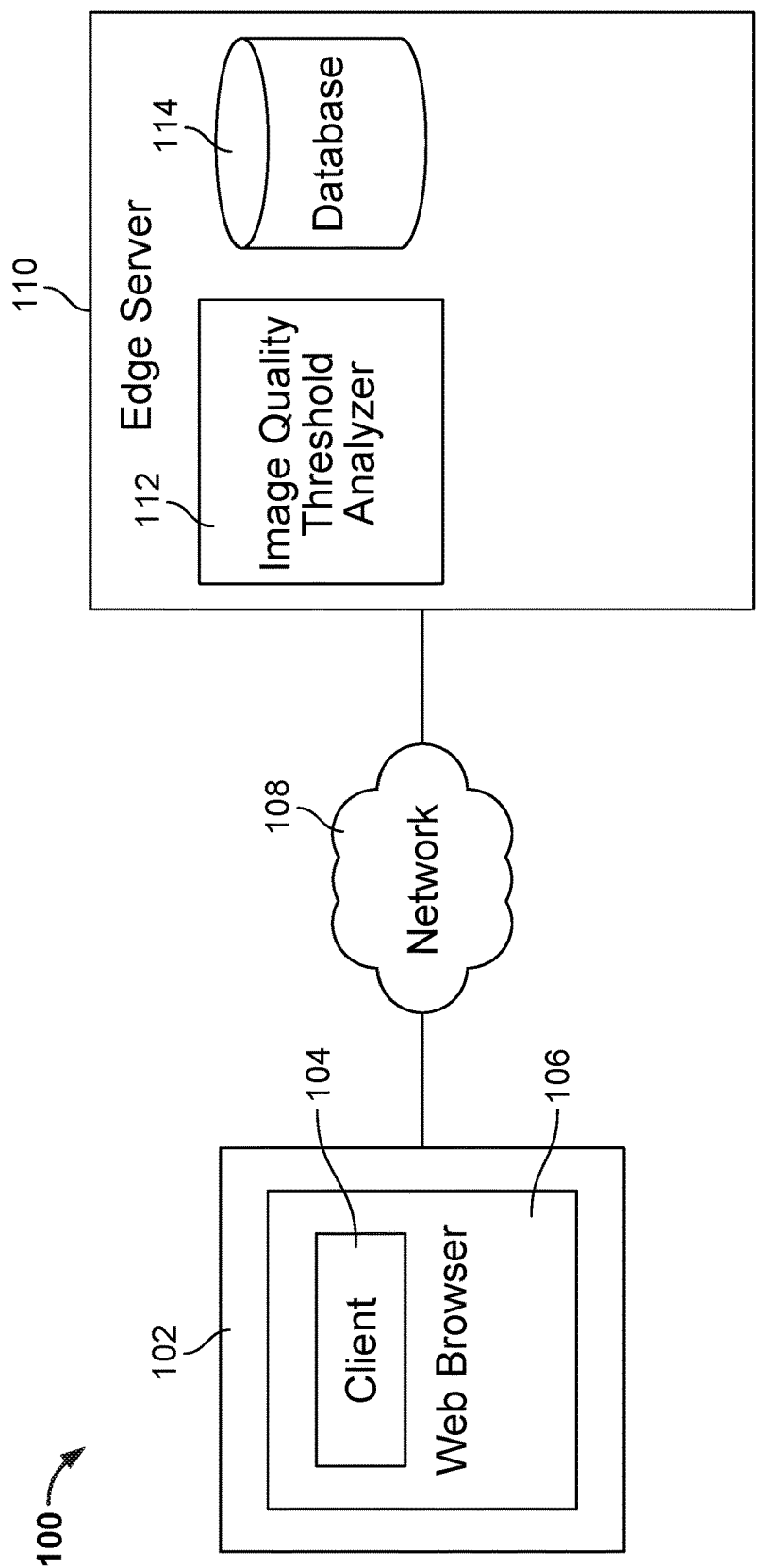
FIG. 1 illustrates an embodiment of a system 100 for efficient delivery of images to end-user devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One way to reduce the size of an image file, and thus its network footprint, is by transcoding the image from its original encoding format to a different encoding format with a reduced file size and quality before sending the modified image through the network. These techniques are herein referred to as front-end optimization compression quality adjustment techniques (FEO-CQ). For example, the original image may be transcoded to a lossy image format with a lower image quality before it is sent through the network.

Lossy compression algorithms trade quality for the degree of compression. A lower quality image results in a smaller file, whereas a higher quality image results in a larger file. For JPEG images, the quality level (Q level) ranges from 1% (lowest quality) to 100% (almost no loss of quality). The lower the Q level of an image, the greater the amount of distortion from the original image. Compression algorithms that support lossy compression include JPEG, JPEG 2000, WebP, JPEG XR, and the like.

FEO-CQ techniques have a number of drawbacks. Different types of images may differ as to which Q levels are appropriate or optimal. Some images can be compressed significantly but still look visually acceptable, while other images can only be compressed by a small amount before they become visually unacceptable to most users. The Q level of the modified file should be preferably selected such that the image quality does not degrade appreciably from that of the original image file. However, FEO-CQ techniques do not take into account the diversity of the images. If a fixed Q level is used to compress all images, then most images will have Q levels that are either lower or higher than their respective appropriate or optimal Q levels. On the other hand, manually selecting the appropriate Q level for every single image is highly inefficient and not a practical solution either.

One way to reduce the wait time experienced by an end-user of an image is to stream the image to the user device in partial download mode, as opposed to sending it in full download mode. In full-download mode, the web application (e.g., an application that runs on a web browser) downloads the entire image content onto the user device and then displays the image. Using full-download mode to download dynamic multimedia-rich content in a mobile environment may lead to unacceptable long transfer times and low QoE for the end-users. In contrast, in partial-download mode, the web application starts to render an image on the user device as soon as a portion of the image file is buffered. For example, progressive image encoding (e.g., progressive JPEG encoding) allows rendering after partial download. Through a shorter latency before the initial display of image content and a more efficient prioritization of bandwidth, partial-download mode reduces the transfer time and provides better QoE for the end-users.

One key parameter in partial-download mode of image-delivery is the threshold t selected for the initial rendering of the image. For example, threshold t may be a percentage of the image size, where $0 \leq t \leq 100\%$. For example, if t=40%, then after the initial 40% of an image file is received, the web browser may start to render the received portion, displaying a lower quality and distorted initial version of the original image. The initial rendered portion should display a reasonable image without degrading the image quality to the extent that it becomes clearly noticeable to the end-user. However, different images have different appropriate or optimal t thresholds. Without taking into account the diversity of the images and using a fixed t threshold to deliver all images, most images will have t thresholds that are either lower or higher than their respective appropriate or optimal t thresholds. On the other hand, manually selecting an appropriate t threshold for every single image is highly inefficient and not a practical solution either.

In summary, image delivery using partial-download mode has a number of existing problems. First, there is a lack of a universally applicable threshold for determining the deliverable image buffer size. Second, there is a lack of a quantitative definition for QoE for a given image. Third, it is difficult to determine a suitable threshold for every single image in large-scale web delivery service (WDS).

FIG. 1 illustrates an embodiment of a system 100 for efficient delivery of images to end-user devices. System 100 includes device 102, network 108, and edge server 110 (also referred to as a proxy server). Examples of device 102 include laptop computers, desktop computers, tablet computers, smartphones, and other mobile devices. Web browser 106 is running on device 102.

In some embodiments, an optional client 104 is running within web browser 106. For example, client 104 may be an Instart Nanovisor that is injected into web browser 106 by edge server 110 (e.g., an Instart edge server) to interface between web browser 106 and edge server 110 for efficient delivery of various types of data (e.g., images, videos, audio clips, scripts, text, and webpage files) to device 102. In some embodiments, client 104 may be injected into web browser 106 based on standards-based (e.g., HTML or JavaScript) procedures. For example, after edge server 110 receives a request from web browser 106 requesting an HTML webpage file, edge server 110 may parse the HTML webpage file, inject client 104 into the HTML webpage file, and then send the response back to web browser 106. In some embodiments, client 104 may be injected by adding JavaScript client code in the head section of the HTML webpage file. In some embodiments, the user may add the script to their own HTML webpage file.

Device 102 is connected to edge server 110 through network 108. Network 108 may be any combination of public or private networks, including intranets, local area networks (LANs), wide area networks (WANs), radio access networks (RANs), Wi-Fi networks, the Internet, and the like. Edge server 110 includes image quality threshold analyzer 112 and database 114, as will be described in greater detail below. In some embodiments, image quality threshold analyzer 112 and database 114 may be located on one or more hosts that are external to edge server 110. In some embodiments, database 114 comprises an image database. In some embodiments, database 114 comprises a database that stores image signatures.

Figure 2:
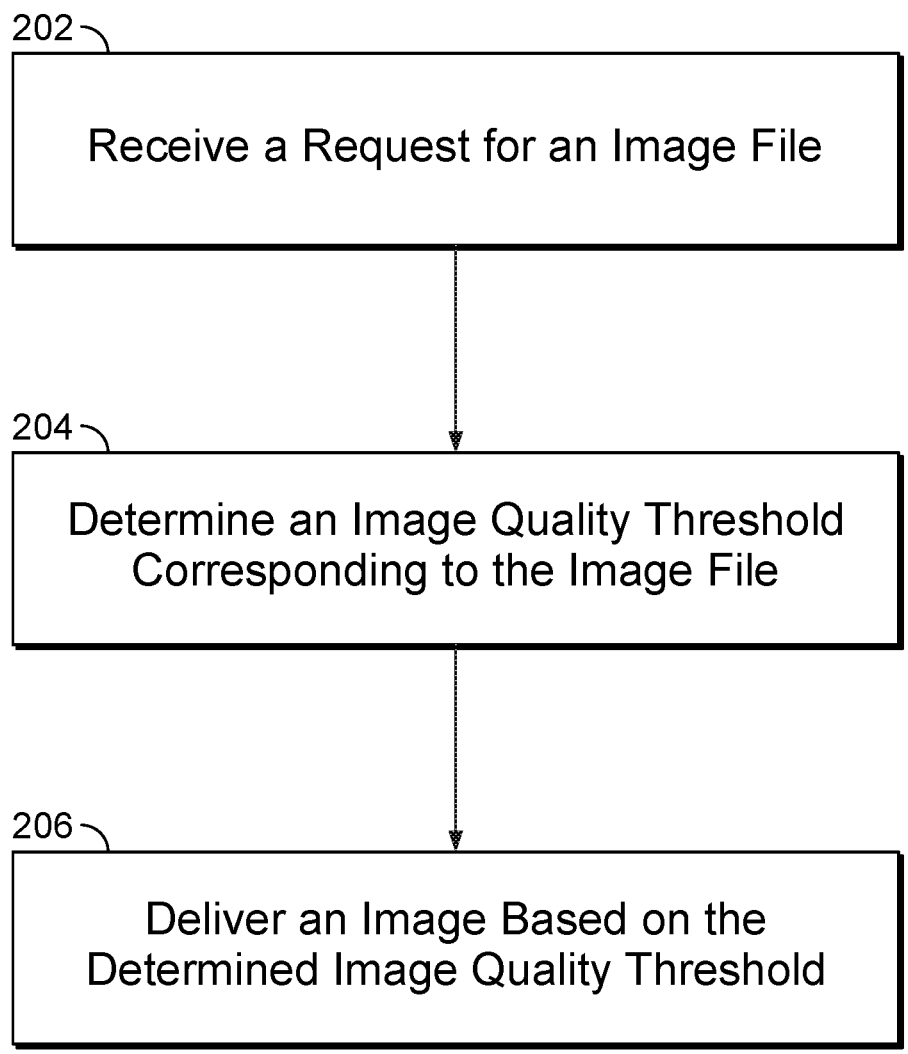
FIG. 2 illustrates an embodiment of a process 200 for efficient delivery of images to end-user devices.

FIG. 2 illustrates an embodiment of a process 200 for efficient delivery of images to end-user devices. In some embodiments, process 200 runs on edge server 110 in system 100 of FIG. 1. At 202, a request for an image file is received. For example, the request for the image file is received from web browser 106 or a client 104 that is injected into web browser 106. At 204, an image quality threshold is determined. For example, the image quality threshold may be determined by image quality threshold analyzer 112 of edge server 110. At 206, the image is delivered to web browser 106 or client 104 based on the determined image quality threshold.

In some embodiments of process 200, edge server 110 reduces the size of the requested image file, and thus its network footprint, by transcoding the image to a modified image file with a reduced file size and quality before sending the modified image file through the network to web browser 106 or client 104. In these embodiments, the image quality threshold determined by image quality threshold analyzer 112 of edge server 110 at step 204 is a Q level that ranges from 1% (lower quality) to 100% (almost no loss of quality). The lower the Q level of the modified image file, the greater the amount of distortion from the original image and the smaller the size of the modified image file. The higher the Q level of the modified image file, the smaller the amount of distortion from the original image and the greater the size of the modified image file. The determined Q level is an appropriate or optimal Q level specific to the requested image file as determined by image quality threshold analyzer 112. At 206, edge server 110 transcodes the original image file to the modified image file at the determined Q level before sending the modified image file through the network to web browser 106 or client 104.

In some embodiments of process 200, edge server 110 sends the requested image file to web browser 106 or client 104 in partial download mode. In these embodiments, the image quality threshold determined by image quality threshold analyzer 112 of edge server 110 at step 204 is a t percentage threshold that ranges from 1% (lower quality) to 100% (highest quality) in size of the original file. The determined t percentage threshold is an appropriate or optimal t percentage specific to the requested image file as determined by image quality threshold analyzer 112. At 206, edge server 110 sends the requested image file to web browser 106 or client 104 in partial download mode, and web browser 106 starts to render the image on the user device as soon as t percent of the original image file is buffered. The buffer size is t percent of the original image file.

Image quality threshold analyzer 112 uses a simple quantitative metric for characterizing the Quality of Experience (QoE) for any given image that is sent through a web delivery service (WDS). The quantitative metric is a quantitative signature known as the variation of quality signature (VoQS). The signature identifies the quality degradation of an image as it passes through a web delivery pipeline. The advantage of VoQS is that it allows any two arbitrary images (e.g., images of different sizes or formats) to be compared in the context of web delivery performance; images that have similar VoQSs have similar web delivery performance. Therefore, images in a large database may be separated into multiple clusters, each cluster including images that have similar VoQSs and thus similar web delivery performances. Once the images are separated into different clusters, an exemplar, or best representative, image may be selected for each cluster, and an appropriate image quality threshold may be determined for the exemplar image. Since the images within the same cluster have similar web delivery performances, the assigned image quality threshold for the exemplar image is also an appropriate image quality threshold for the other images within the same cluster. When image quality threshold analyzer 112 is requested to determine an image quality threshold for a new image (e.g., at step 304 of process 300), the analyzer computes the new image's VoQS, compares it to the VoQS of the stored exemplars to find a nearest neighbor to the new image, and selects an appropriate image quality threshold for the new image based on the nearest exemplar.

Figure 3:
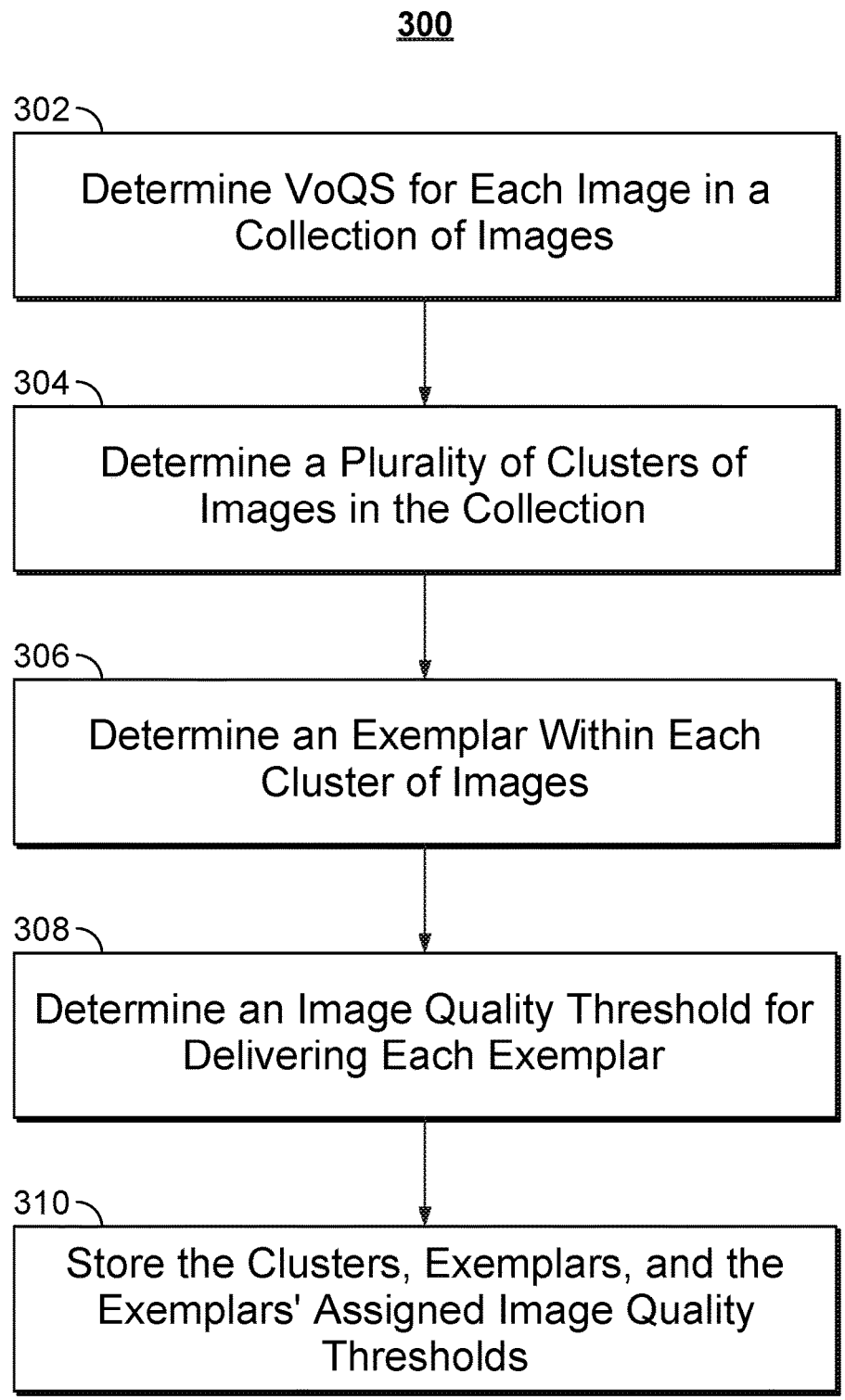
FIG. 3 illustrates an embodiment of a process 300 for the offline process for efficient delivery of images to end-user devices.

Image quality threshold analyzer 112 includes two components. In some embodiments, the first component may be implemented as an offline process, and the second component may be implemented as an online or real-time process. FIG. 3 illustrates an embodiment of a process 300 for the offline process. FIG. 4 illustrates an embodiment of a process 400 for the online process. Process 300 and process 400 are together referred to as the VoQS unsupervised image categorization technique.

With reference to FIG. 3, at 302, the VoQS of each image in a collection of images is determined. To cover a wide variety of images, the images may be collected from various image databases and content providers. The collected images may include images in different encoding formats. The collected images may include images in different formats optimized for different user devices. For example, the image formats may be optimized for displaying on desktop monitors, laptop computers, tablets, smartphones, and the like.

The variation of quality signature (VoQS) of a particular image includes a vector of signatures, and the elements are the signatures of different versions of the image when different levels of distortion/compression are introduced to the image in exchange for their corresponding reduced image file sizes.

In the partial-download example, if VoQS of an original reference image I is Q(I), then Q(I) may be a vector defined as:

$$Q(I) \triangleq [q(I_{t1}), q(I_{t2}), \ldots q(I_{tN})] \quad \text{Equation (1)}$$

where

N is the number of level of distortions introduced to image I;

$t_i$ is the percentage threshold of the image size when the initial rendering of the image is performed, and $0 \leq t_i \leq 100\%$;

$I_{t1}, I_{t2}, \ldots I_{tN}$ are the distorted (noisy) versions of image I when only $t_i$ percent of I has been rendered;

$q(I_t)$ is the element signature of the image I rendered at t threshold, i.e., $I_t$; and $q(I_0) \triangleq 0$ and $q(I_{100}) \triangleq 1$.

In the JPEG transcoding example, if VoQS for an original reference image I is Q(I), then Q(I) may be a vector defined as:

$$Q(I) \triangleq [q(I_{Q1}), q(I_{Q2}), \ldots q(I_{QM})] \quad \text{Equation (2)}$$

where

M is the number of level of distortions introduced to image I;

Qi is the JPEG Q level, and $1 \leq Qi \leq 100\%$;

$I_{Q1}, I_{Q2}, \ldots I_{QN}$ are the distorted (noisy) versions of image I at different JPEG Q levels;

$q(I_Q)$ is the element signature of $I_Q$; and $q(I_0) \triangleq 0$ and $q(I_{100}) \triangleq 1$.

The signature for each level of distortion (i.e., $q(I_t)$ or $q(I_Q)$) may be measured in different ways. The signature should be efficient to compute, and the signature should measure a degree of similarity between the reference image I and a distorted version of the image. For example, the signature for each level of distortion may be a measure of the perceptual quality of the image experienced by an end-user when that level of distortion is introduced to the image. In some embodiments, the signature for each level of distortion may be determined by soliciting subjective feedback from human users. However, this approach is time-consuming and therefore not scalable for large image databases. In some embodiments, the signature for each level of distortion may be an objective measure of the perceptual quality of the image.

An objective measure of the perceptual quality of the image may be a combination of one or more metrics. For example, one metric is the peak signal-to-noise ratio (PSNR), which is the ratio between the maximum power of a signal and the power of corrupting noise that affects the fidelity of its representation. Another metric is the structural similarity metric (SSIM). SSIM is a metric that measures the similarity between two images. SSIM tries to explicitly model the function of the human visual system. PSNR and SSIM are examples of metrics that may be used to measure the perceptual quality of the distorted images. Other objective measures may be used as well.

In the partial-download example, using the combination of PSNR and SSIM (denoted as $p(I_t)$ and $s(I_t)$, respectively) as the objective measure of the perceptual quality of the distorted streamed image $I_t$, then the signature may be determined as $$q(I_t) = [p(I_t), s(I_t)] \quad \text{Equation (3)}$$

The number of elements of Q(I) is equal to M*2. For example, if the number of level of distortions (M) introduced to image I is 10, such that $$Q(I) \triangleq [q(I_{10\%}), q(I_{20\%}), q(I_{30\%}), q(I_{40\%}), q(I_{50\%}),$$
$$q(I_{60\%}), q(I_{70\%}), q(I_{80\%}), q(I_{90\%}), q(I_{100\%})]$$

Then Q(I) has a total of 20 elements. The length of the VoQS vector (i.e., Q(I)) linearly impacts the computational complexity of the offline and online computations. Therefore, the length of the VoQS vector should be selected based on the availability of computational resources, acceptable response time, and the like.

In some embodiments, Q(I) is normalized. For example, the components of Q(I), (e.g., the PSNR and SSIM components) may be normalized by computing their z-scores across the entire image database for normalization.

With continued reference to FIG. 3, at 304, the collection of images is categorized into a plurality of clusters of images, each cluster including images that have similar VoQSs and thus similar web delivery performances. VoQS defines a metric space for a large-scale database of images. In some embodiments, the similarity or the distance between any two images I' and I" may be defined as:

$$\text{sim}(I',I'')=-\text{sqrt}(\Sigma(Q(I')-Q(I''))^2) \quad \text{Equation (4)}$$

Equation (4) allows a quantitative comparison between any two arbitrary images in the context of web content delivery. Equation (4) is one exemplary measure of the similarity between two images based on Euclidean distance. Other measures may be used as well. For example, Equation (4) may be modified to give unequal weights to different elements of the VoQSs vectors. In some embodiments, the weights may be learned through machine learning.

Different clustering techniques may be used to divide the collection of images into a plurality of clusters of images. Examples of clustering techniques include K-means clustering and EM algorithms. Another example of the clustering techniques is affinity propagation clustering. The affinity propagation algorithm may be used in conjunction with the image similarity measure defined in Equation (4) to find QoE-driven image clusters from the image database. The affinity propagation algorithm does not require a pre-specification of the number of expected clusters.

With continued reference to FIG. 3, at 306, an exemplar image that best represents each cluster of images is selected. Different criteria may be used in selecting the exemplar image. For example, to determine the total distance from a particular image in a cluster to all the remaining images in the cluster, the pairwise distances between the VoQS of the particular image and the VoQSs of all other images are summed. The image that is closest to all the other images in the cluster is selected as the exemplar image. Some clustering techniques (e.g., K-medoid clustering and affinity propagation clustering) determine an exemplar for each cluster automatically.

With continued reference to FIG. 3, at 308, an image quality threshold for delivering each exemplar image is determined. In some embodiments, the image quality threshold (or the buffer size) for delivering each exemplar image is determined manually by a human-user. Because the image database is divided into only a small number of clusters, each represented by an exemplar image, the problem of selecting the thresholds and buffer size for a large number of images (e.g., millions of images) is reduced to selecting the thresholds manually for a few chosen exemplar images. In this case, unsupervised clustering is combined with minimal human labeling to provide quality-optimized image delivery. However, image quality determination can also be learned using a supervised or semi-supervised machine learning technique. For example, when there are enough images with associated quality levels labeled, a machine learning classifier may be used to predict the quality threshold in a supervised machine learning approach as well.

With continued reference to Figure, at 310, the clusters, the exemplars of the clusters, and the exemplars' assigned image quality thresholds are stored, e.g., in image database 114 of edge server 110 as shown in FIG. 1.

FIG. 4 illustrates an embodiment of a process 400 for the online process. After process 300 has been performed, process 400 may be executed when image quality threshold analyzer 112 is requested to determine an image quality threshold for a new image (e.g., at step 304 of process 300). At 402, the VoQS of the new image is determined as described in step 302 of process 300.

At 404, the nearest exemplar image to the new image is determined by comparing the VoQS of the new image to the VoQSs of the exemplar images. For example, the nearest exemplar image to the new image may be determined using an efficient nearest-neighbor lookup.

At 406, the image quality threshold (or its equivalent buffer size) for delivering the new image is determined based on the image quality threshold assigned to the nearest exemplar image. In one example, both the new image and the nearest exemplar image have the same image format (e.g., JPEG). In this case, the image quality threshold (e.g., a t threshold or Q level) assigned to the nearest exemplar image may be assigned to the new image as well. In another example, the new image is a WebP image file, while the nearest exemplar image is a JPEG image file. In this case, a simple conversion (e.g., by using lookup-tables) is performed to convert the image quality threshold to a new value that takes into consideration the differences between the JPEG and WebP formats. The new converted value is then assigned to the new image as the image quality threshold for delivery.

Figure 5:
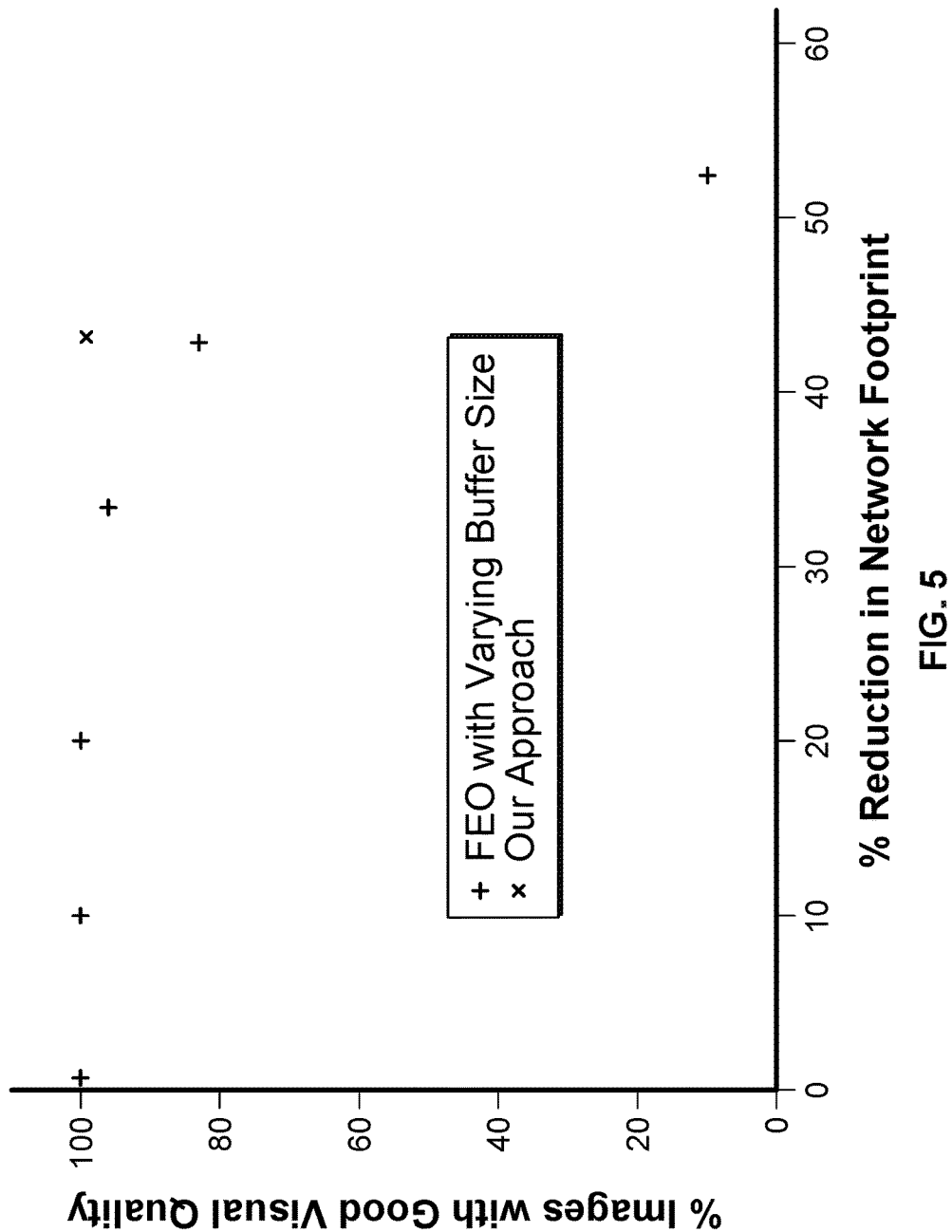
FIG. 5 illustrates plots of the overall percentage of reduction in network footprint versus the percentage of images with good visual quality using different techniques.

FIG. 5 illustrates plots of the overall percentage of reduction in network footprint versus the percentage of images with good visual quality using the FEO-CQ approach and the VoQS approach, respectively. The plots in FIG. 5 correspond to a dataset of 2,238 images sampled from multiple content providers, servers, and vendors. The VoQS unsupervised image categorization technique described above significantly reduces the average number of bits per image, by about 43%. Comparing to the FEO-CQ approach of selecting one fixed compression parameter for the entire image dataset, the VoQS unsupervised image categorization technique significantly reduces the network footprint of the delivered images, while preserving the perceptual quality across the entire image database.

Figure 6A:
FIG. 6A illustrates an image optimized for viewing on a smartphone.
Figure 6B:
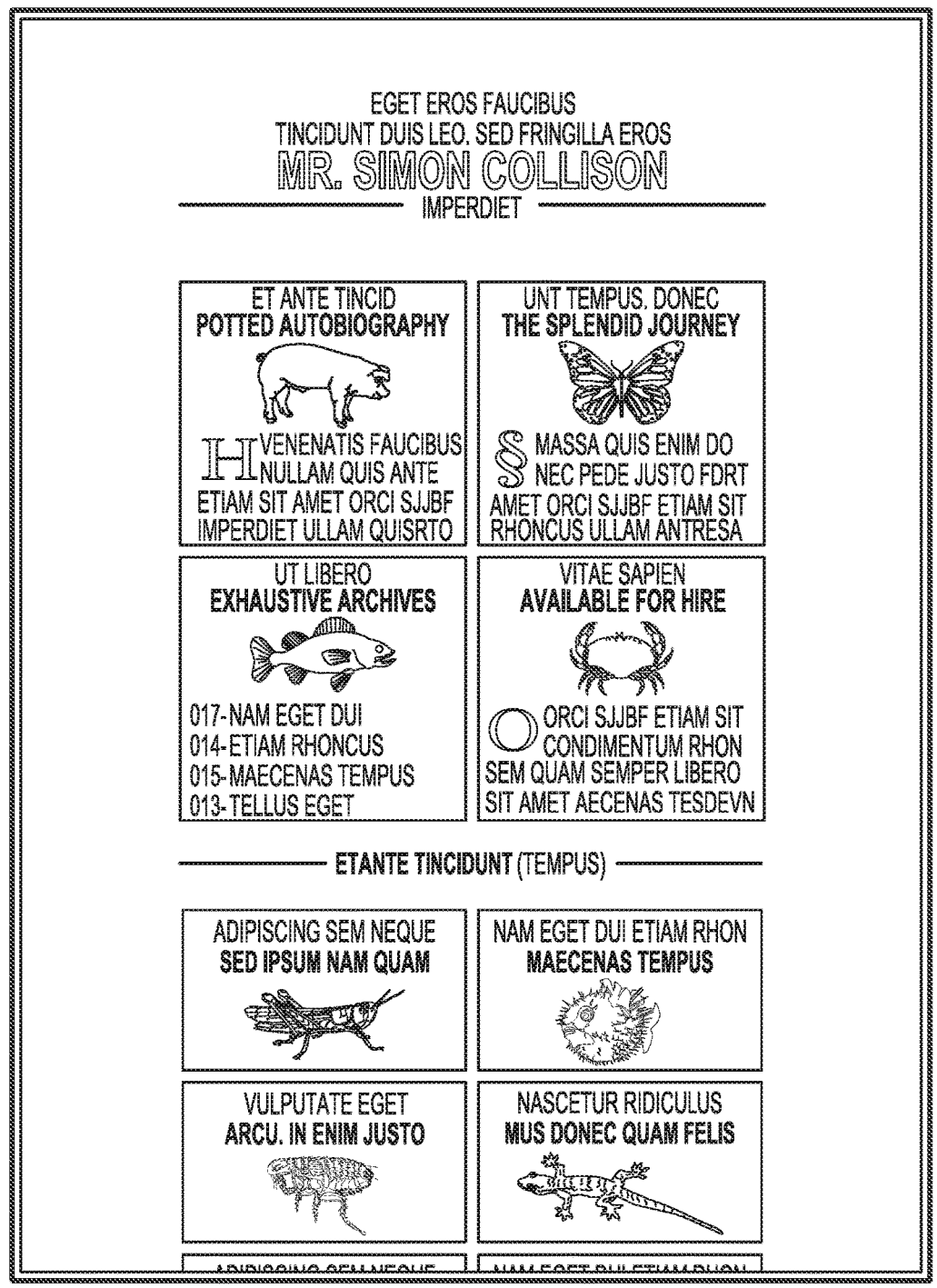
FIG. 6B illustrates an image optimized for viewing on a tablet computer.
Figure 6C:
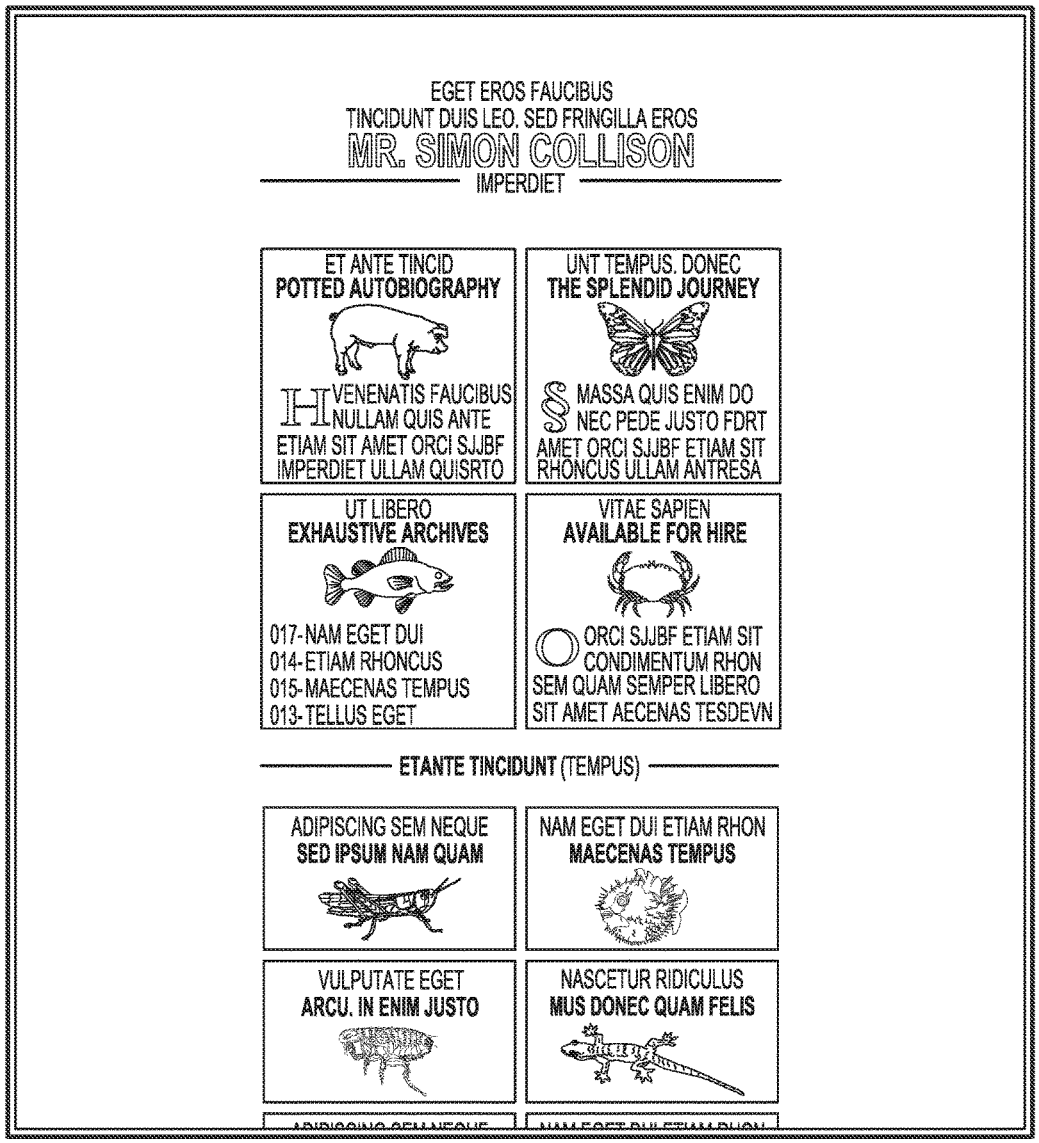
FIG. 6C illustrates an image optimized for viewing on a laptop computer.
Figure 6D:
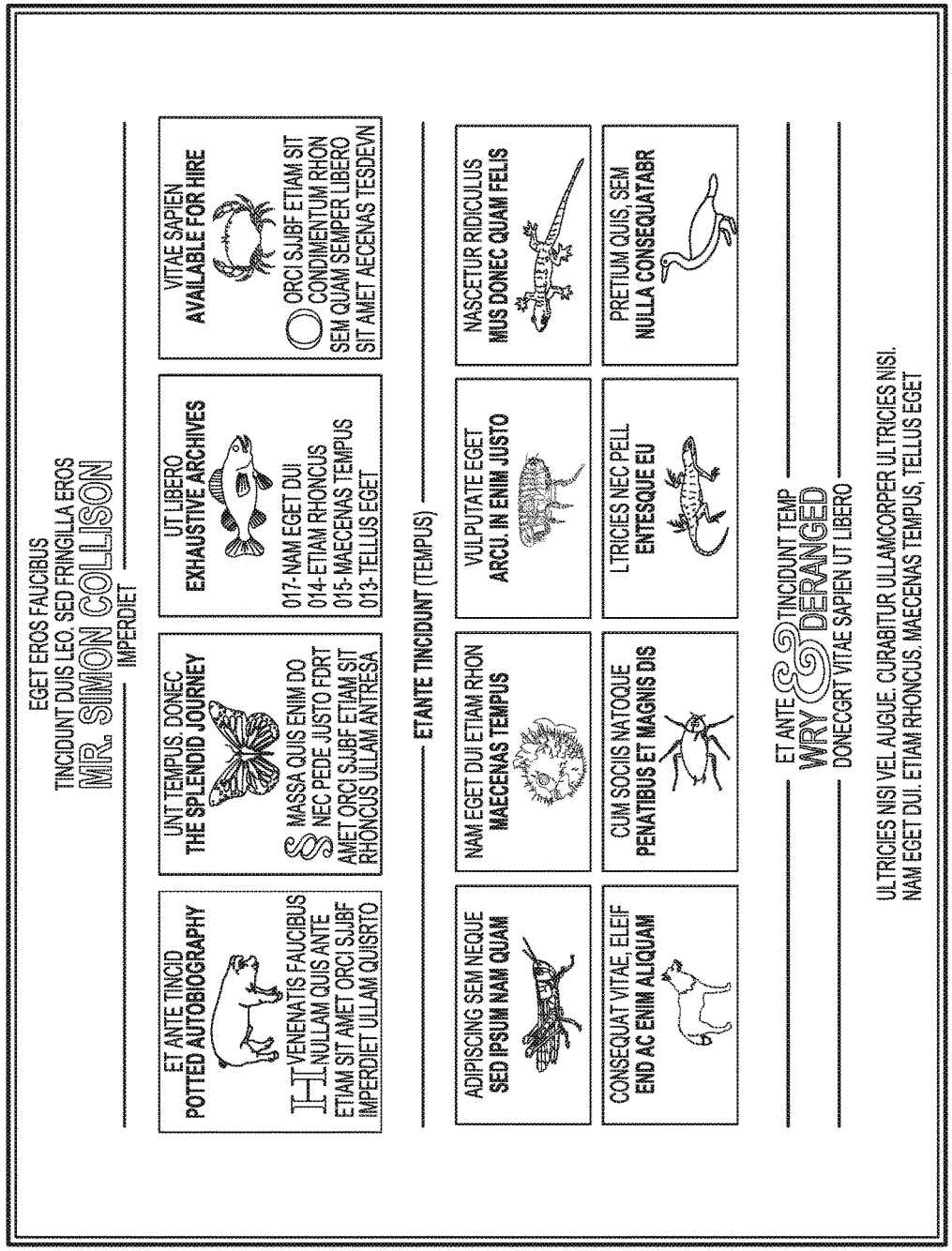
FIG. 6D illustrates an image optimized for viewing on a desktop monitor.

Image formats may be optimized for displaying on different device display formats. For example, they may be optimized for displaying on desktop monitors, laptop computers, tablets, smartphones, and the like. FIG. 6A illustrates an image optimized for viewing on a smartphone. FIG. 6B illustrates an image optimized for viewing on a tablet computer. FIG. 6C illustrates an image optimized for viewing on a laptop computer. FIG. 6D illustrates an image optimized for viewing on a desktop monitor.

In some embodiments, the VoQS unsupervised image categorization technique discussed above may be used to categorize and select images with formats that are specifically optimized and targeted for different device display formats. In one experiment, images that are optimized for the four different device types above (smartphone, tablet, laptop, and monitor) are collected. The VoQS for each image is computed (e.g., see step 302 of process 300), and a plurality of clusters of images are determined (e.g., see step 304 of process 300). It has been shown that the VoQS image categorization technique separates the images into four different clusters, each cluster corresponding to one of the device types.

Figure 7:
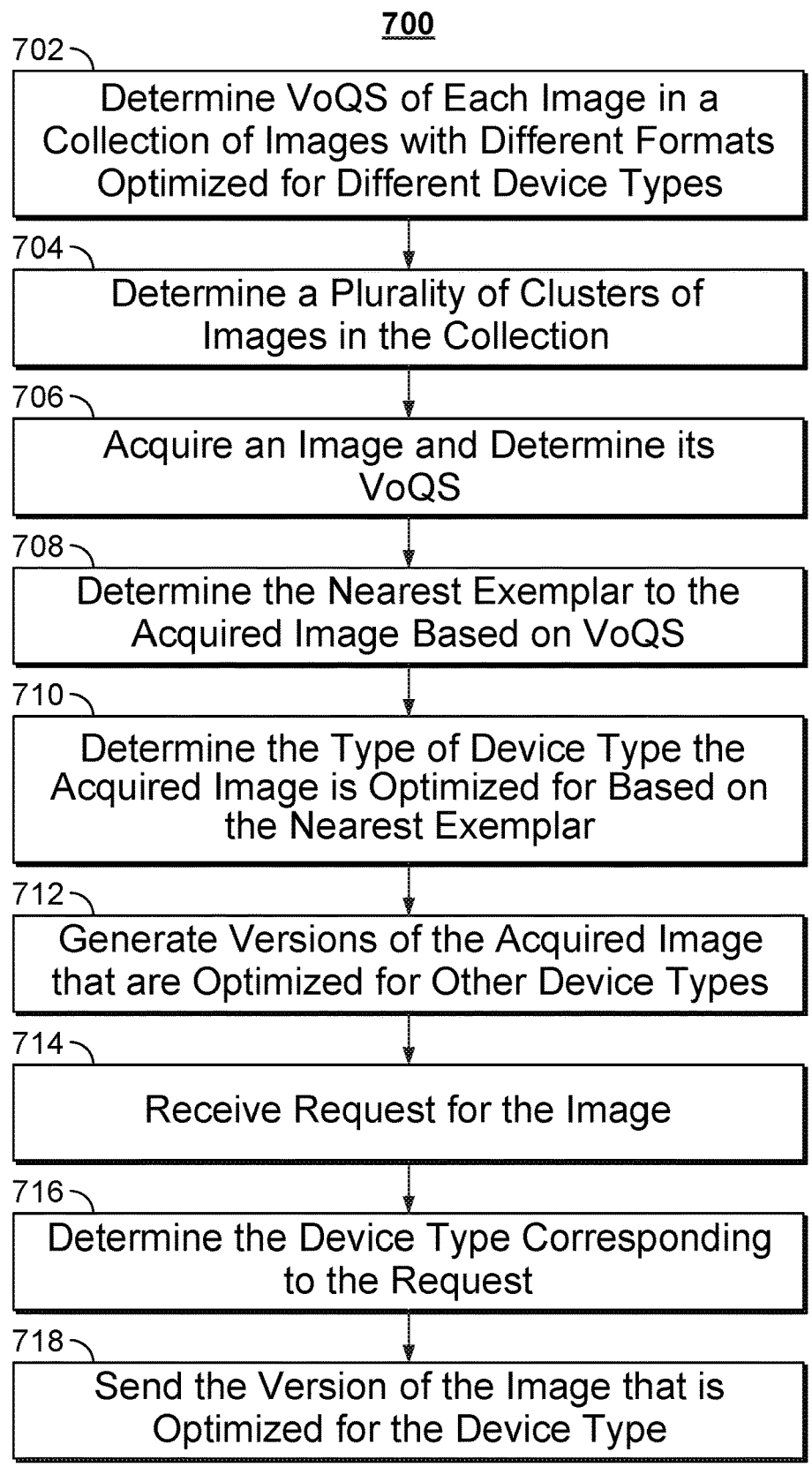
FIG. 7 illustrates an embodiment of a process 700 for device-targeted image delivery.

FIG. 7 illustrates an embodiment of a process 700 for device-targeted image delivery. In some embodiments, process 700 is performed by edge server 110 in FIG. 1. When a user requests an image to be downloaded to the user's device, process 700 can be executed to deliver a version of the requested image that is optimized for the user's device. Steps 702 to 712 are performed offline and prior to the receiving of the download request of the image. Steps 714 to 718 are performed online and after the receiving of the download request of the image.

At 702, the VoQS of each image in a collection of images with different formats optimized for different device types is determined, as similarly described in step 302 of process 300. To cover a wide variety of images, the images may be collected from various image databases and content providers. The collected images may include images in different formats optimized for different user devices. For example, the image formats may be optimized for display on desktop monitors, laptop computers, tablets, smartphones, and the like.

At 704, the collection of images is categorized into a plurality of clusters of images (as similarly described in step 304 of process 300), each cluster including images that have similar VoQSs and thus similar web delivery performances. As described above, images that are optimized for different device types are separated into different clusters. Each cluster may be identified and labeled as a cluster of images targeted for a particular type of user device.

At 706, an image is acquired. The acquired image may be obtained from different sources, including content providers, image databases, end-users, and the like. The VoQS of the acquired image is determined.

At 708, the nearest exemplar image to the acquired image is determined by comparing the VoQS of the acquired image to the VoQSs of the exemplar images, as similarly described in step 404 of process 400.

At 710, the type of device the acquired image is optimized for is determined based on the nearest exemplar. For example, if the nearest exemplar is an image optimized for smartphones, then the acquired image is determined as an image optimized for smartphones as well. Information of the device type corresponding to the acquired image is also stored.

At 712, versions of the acquired image that are optimized for other device types may be generated and stored. For example, if the acquired image is determined as an image optimized for smartphones, then versions of the image corresponding to the device types of tablets, laptop computers, and desktop monitors may be generated and stored.

At 714, a request for the image is received. At 716, the device type corresponding to request is determined. For example, client 104 may notify edge server 110 the user device type on which web browser 106 runs. At 718, the version of the image that is optimized for the user device type is delivered to web browser 106.

As described above, the VoQS unsupervised image categorization technique allows large image database to be efficiently parsed into coherent groups in a content-dependent and device-targeted manner for optimized image content delivery. The technique significantly reduces the average delivered bits per image across a large image database, while preserving the perceptual quality across the entire image database. In some embodiments, the VoQS unsupervised categorization technique may be further extended to deliver other media files, including audio and video files.

Figure 8:
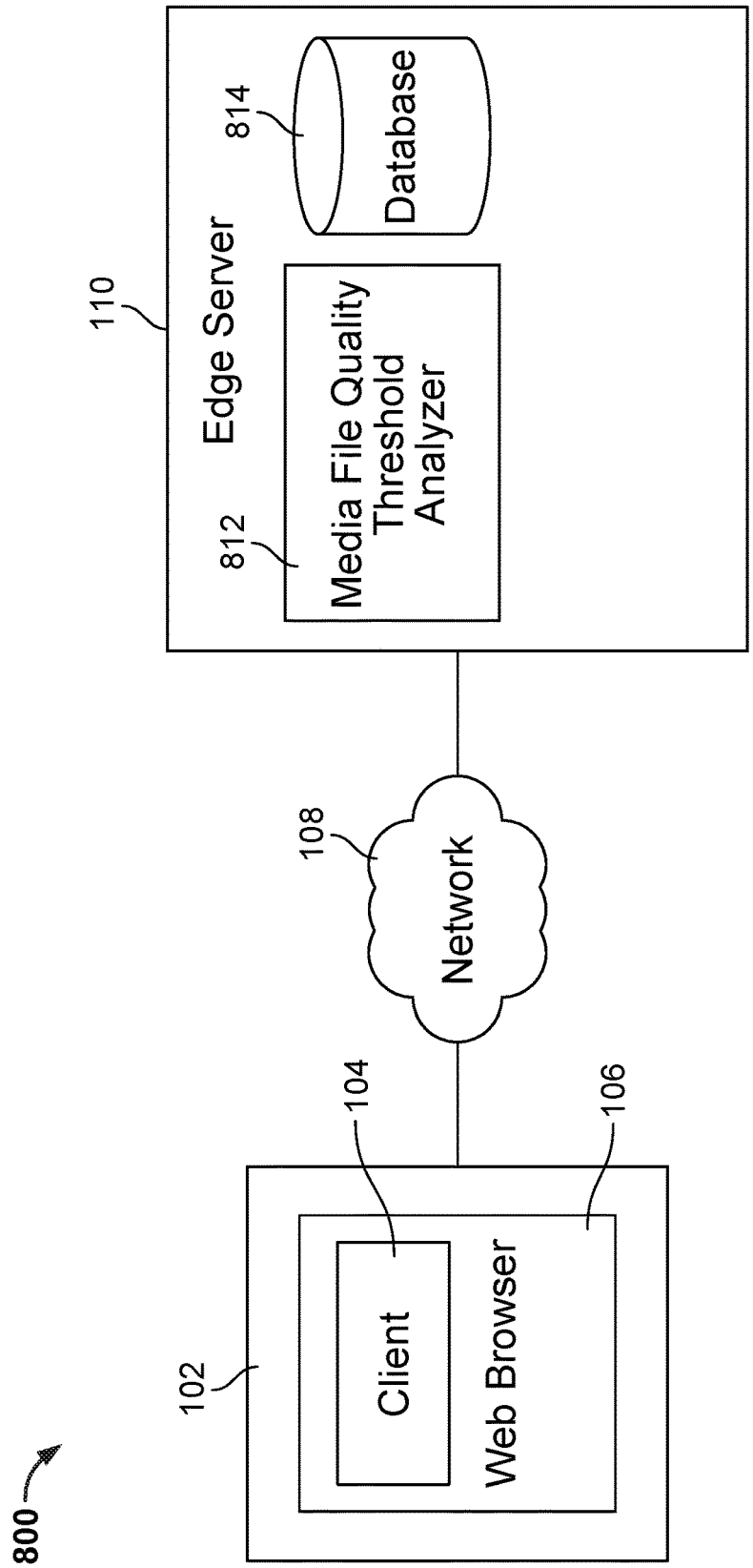
FIG. 8 illustrates an embodiment of a system 800 for efficient delivery of media files to end-user devices.

FIG. 8 illustrates an embodiment of a system 800 for efficient delivery of media files to end-user devices. System 800 is similar to system 100. System 800 includes device 102, network 108, and edge server 110 (also referred to as a proxy server).

Edge server 110 includes media file quality threshold analyzer 812 and database 814. In some embodiments, media file quality threshold analyzer 812 and database 814 may be located on one or more hosts that are external to edge server 110. In some embodiments, database 814 comprises a media file database. In some embodiments, database 814 comprises a database that stores media file signatures.

Figure 9:
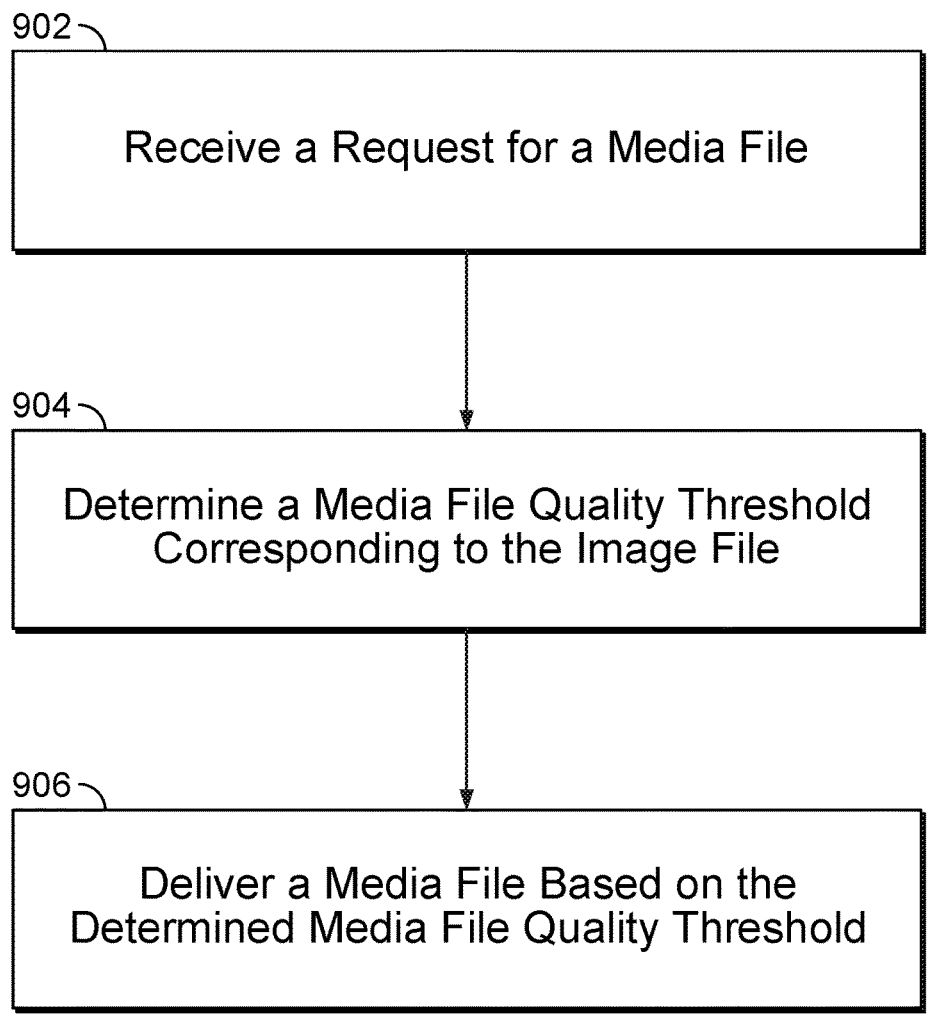
FIG. 9 illustrates an embodiment of a process 900 for efficient delivery of media files (e.g., audio and video files) to end-user devices.

FIG. 9 illustrates an embodiment of a process 900 for efficient delivery of media files (e.g., audio and video files) to end-user devices. In some embodiments, process 900 runs on edge server 110 in system 800 of FIG. 8. At 902, a request for a media file is received. For example, the request for the media file is received from web browser 106 or a client 104 that is injected into web browser 106. At 904, a media file quality threshold is determined. For example, the media file quality threshold may be determined by a media file quality threshold analyzer 812 of edge server 110. At 906, the media file is delivered to web browser 106 or client 104 based on the determined media file quality threshold.

In some embodiments of process 900, edge server 110 reduces the size of the requested media file, and thus its network footprint, by transcoding the media file to a modified media file with a reduced file size and quality before sending the modified media file through the network to web browser 106 or client 104. In these embodiments, the media file quality threshold determined by media file quality threshold analyzer 812 of edge server 110 at step 904 is a quality level that ranges from 1% (lower quality) to 100% (almost no loss of quality). The lower the quality level of the modified media file, the greater the amount of distortion from the original media file and the smaller the size of the modified media file. The higher the quality level of the modified media file, the smaller the amount of distortion from the original media file and the greater the size of the modified media file. The determined quality level is an appropriate or optimal quality level specific to the requested media file as determined by media file quality threshold analyzer 812. At 906, edge server 110 transcodes the original media file to the modified media file at the determined quality level before sending the modified media file through the network to web browser 106 or client 104.

Similar to image quality threshold analyzer 112, media file quality threshold analyzer 812 also uses VoQS to characterize the Quality of Experience (QoE) for any given media file that is sent through a web delivery service (WDS).

Figure 10:
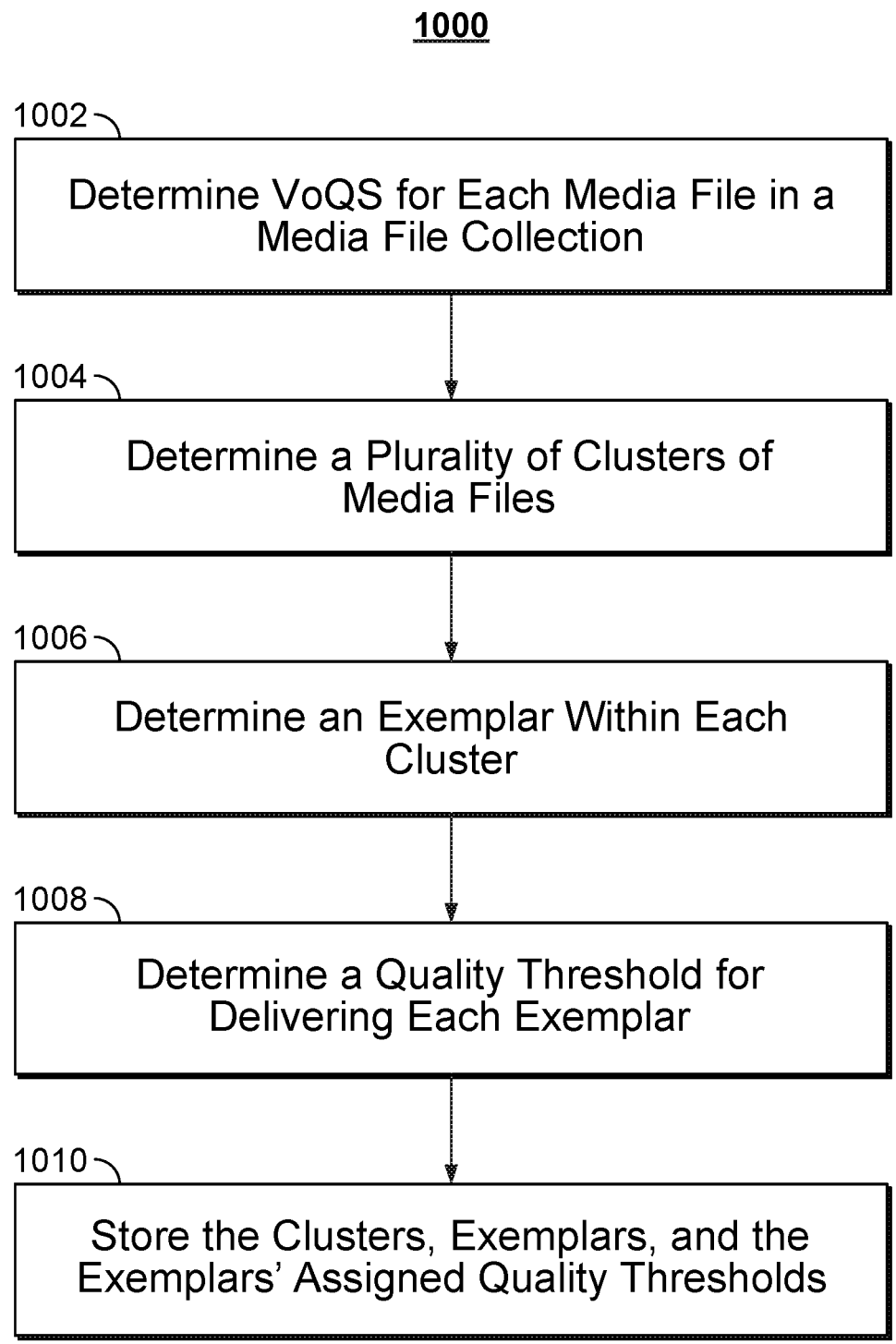
FIG. 10 illustrates an embodiment of an offline process 1000 using the VoQS unsupervised categorization technique adapted for media files.
Figure 11:
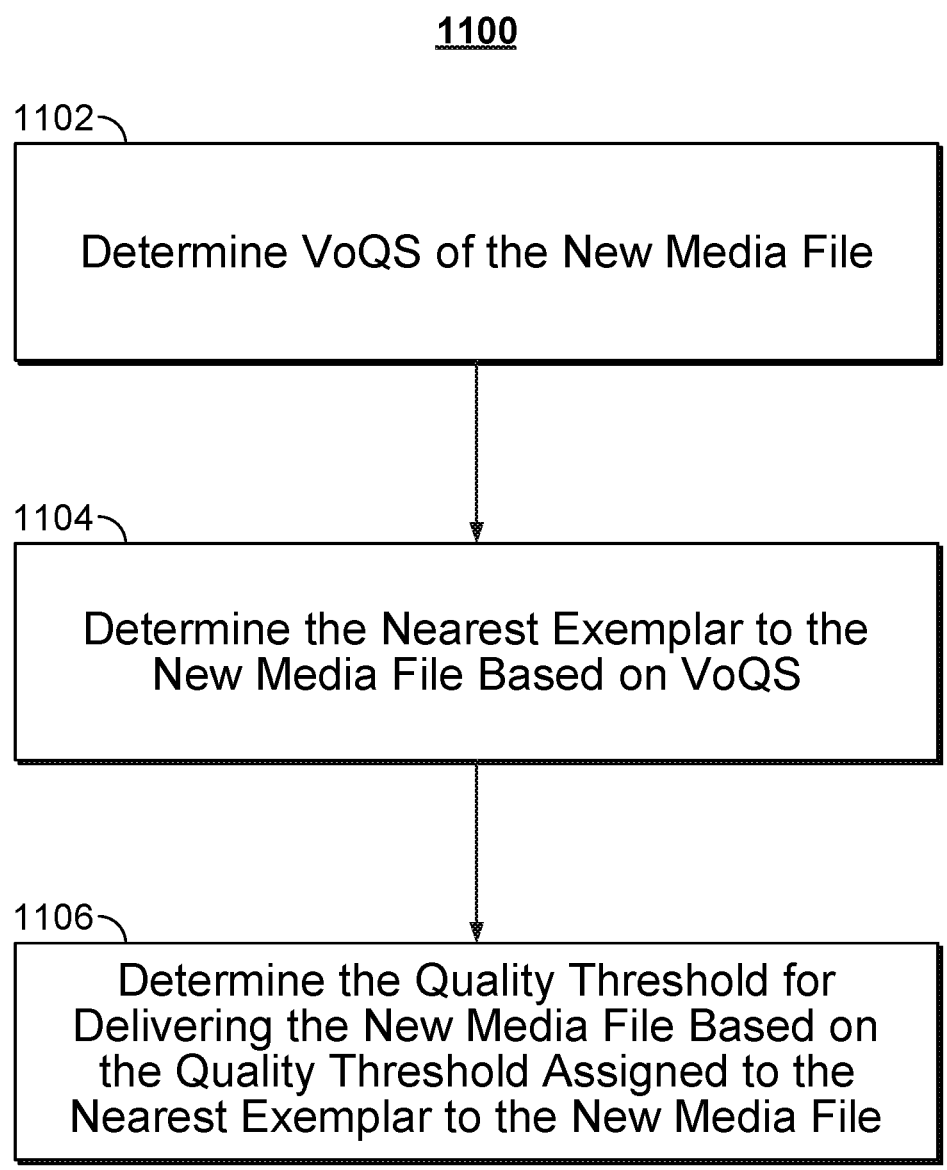
FIG. 11 illustrates an embodiment of an online process 1100 using the VoQS unsupervised categorization technique adapted for media files.

FIG. 10 illustrates an embodiment of an offline process 1000 using the VoQS unsupervised categorization technique adapted for media files. FIG. 11 illustrates an embodiment of an online process 1100 using the VoQS unsupervised categorization technique adapted for media files. Process 1000 and process 1100 are modified from process 300 and process 400, respectively, to handle media files other than images, such as video and audio clips.

The variation of quality signature (VoQS) of a media file includes a vector of signatures, and the elements are the signatures of different versions of the media file when different levels of distortion/compression are introduced to the media file in exchange for corresponding reductions in file sizes.

The signature for each level of distortion may be measured in different ways. The signature should be efficient to compute, and the signature should measure a degree of similarity between the reference media file and a distorted version of the media file. For example, the signature for each level of distortion may be a measure of the perceptual quality of the media file experienced by an end-user when that level of distortion is introduced.

An objective measure of the perceptual quality of the media file may be a combination of one or more metrics. Video clips are similar to images in that the former includes multiple frames of images. In some embodiments, PSNR and SSIM are used as the metrics for measuring the perceptual quality of both images and video clips. PSNR may also be used as a metric for measuring the perceptual quality of audio files. Different metrics may be used to measure the perceptual quality of video clips and audio clips. The examples provided herein are not intended to be exhaustive.

Referring back to FIG. 3 and FIG. 4, both the offline process (process 300 shown in FIG. 3) and online process (process 400 shown in FIG. 4) of the VoQS unsupervised image categorization technique described above include the step of computing the VoQS (variation of quality signature) of one or more images. In the offline process, the VoQS of many newly available images from various image databases and content providers are computed in the background. In the online process, although the VoQS of only one image is calculated at a time, the calculation of the VoQS of the new received image is computationally intensive as compared to other steps (such as steps 404 and 406) in the online process. Therefore, in order to enable a high-volume real-time service, a more efficient and improved method of computing the VoQS of images would be desirable.

Figure 12:
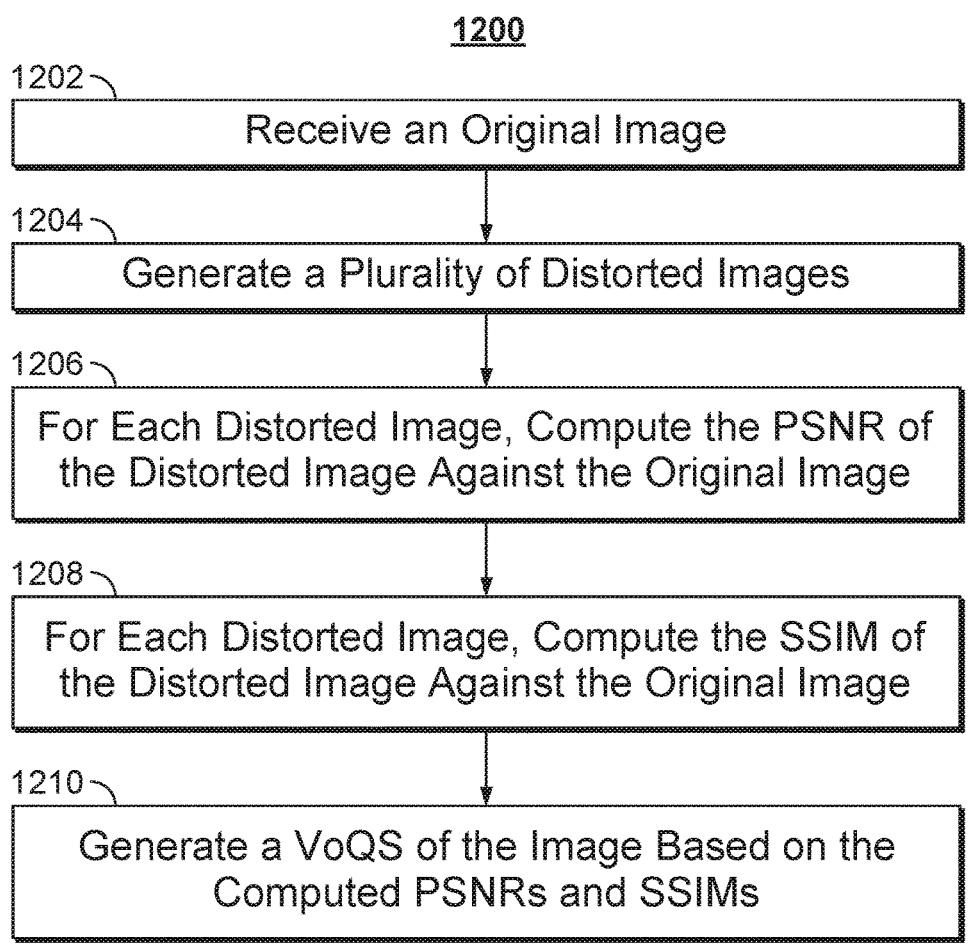
FIG. 12 illustrates an embodiment of a process 1200 for computing a VoQS of an image.
Figure 13:
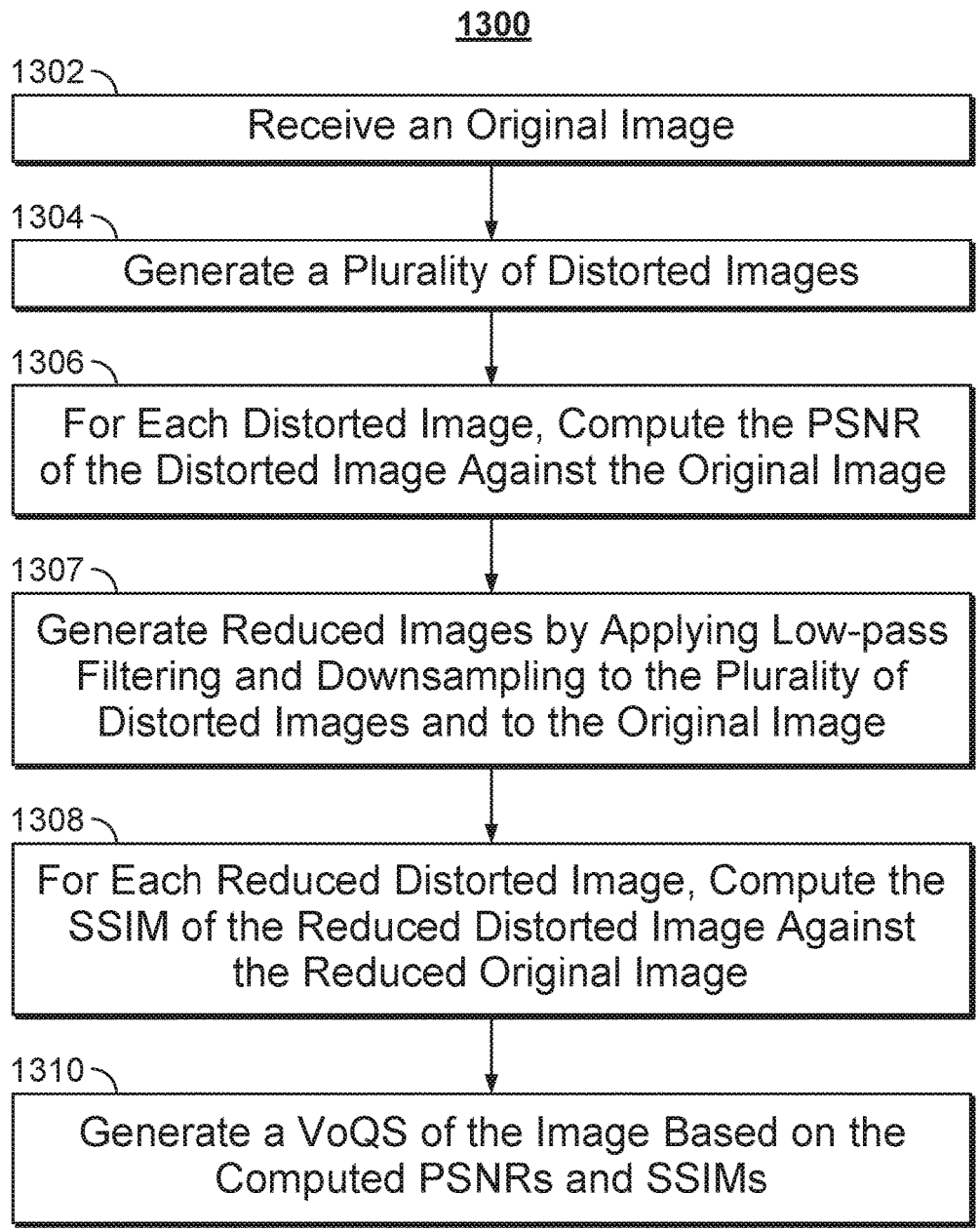
FIG. 13 illustrates an embodiment of an improved process 1300 for computing a VoQS of an image.

FIG. 12 illustrates an embodiment of a process 1200 for computing a VoQS of an image. FIG. 13 illustrates an embodiment of an improved process 1300 for computing a VoQS of an image. In some embodiments, process 1200 or process 1300 may be performed at step 302 of process 300 or step 402 of process 400 by image quality threshold analyzer 112 of edge server 110.

Referring to process 1200, at step 1202, image quality threshold analyzer 112 receives an original image for which a VoQS needs to be computed. At 1204, image quality threshold analyzer 112 generates a plurality of distorted images based on the original image. The plurality of distorted images are different versions of the original image wherein different levels of distortion/compression are introduced to the original image as a tradeoff to achieve correspondingly reduced image file sizes. At 1206, for each of the plurality of distorted images, image quality threshold analyzer 112 computes the peak signal-to-noise ratio (PSNR) of the particular distorted image, with the original image as the reference. At 1208, for each of the plurality of distorted images, image quality threshold analyzer 112 computes the structural similarity metric (SSIM) between the particular distorted image and the original image. At 1210, image quality threshold analyzer 112 computes the VoQS of the original image based on the PSNRs and SSIMs computed at steps 1206 and 1208.

Comparing FIGS. 12 and 13, the differences between process 1200 and process 1300 include an additional step 1307 and a modified step 1308 in process 1300. As will be described in greater detail below, each of the SSIM computations is performed on a reduced version of a distorted image and a reduced version of the original image, thereby significantly reducing the overall computational cost associated with each VoQS. In some embodiments, the overall computational cost associated with each VoQS is reduced by an order of magnitude or more. The advantage of the reduced computational cost is that the VoQS unsupervised image categorization technique (also referred to as the Smart Vision technique) is deployable as a real-time service for delivering a high volume of images.

With continued reference to process 1300, at step 1302, image quality threshold analyzer 112 receives an original image (denoted as image I) for which a VoQS needs to be computed. The original image includes images in different encoding formats, such as JPEG, WebP, Gif, and Png. The original image may include images in different formats optimized for different user devices. For example, the image formats may be optimized for displaying on desktop monitors, laptop computers, tablets, smartphones, and the like.

At 1304, image quality threshold analyzer 112 generates a plurality of distorted images based on the original image. The plurality of distorted images are different versions of the original image wherein different levels of distortion/compression are applied to the original image in exchange for their correspondingly reduced image file sizes. In some embodiments, the plurality of distorted images are $I_{t1}$, $I_{t2}$, ... $I_{tN}$ in Equation (1), which are the distorted (noisy) versions of image I wherein only $t_i$ percent of image I has been rendered. For example, the plurality of distorted images may be $I_{10\%}$, $I_{20\%}$, $I_{30\%}$, $I_{40\%}$, $I_{50\%}$, $I_{60\%}$, $I_{70\%}$, $I_{80\%}$, $I_{90\%}$ and $I_{100\%}$. In some embodiments in which the original image is a JPEG image, the plurality of distorted images may be $I_{Q1}$, $I_{Q2}$, ... $I_{QN}$ in Equation (2), which are the distorted (or noisy) versions of image I at different JPEG Q levels.

At 1306, for each of the plurality of distorted images, image quality threshold analyzer 112 computes the peak signal-to-noise ratio (PSNR) between the particular distorted image and the original image. For example, the PSNRs are $p(I_{t1})$, $p(I_{t2})$, ... $p(I_{tN})$. The PSNR provides a quality measurement of a compressed image with reference to the original; the higher the PSNR, the better the quality of the compressed image.

At 1307, image quality threshold analyzer 112 generates a plurality of reduced distorted images based on the plurality of the distorted images. For example, the plurality of reduced distorted images are $IR_{t1}$, $IR_{t2}$, ..., and $IR_{tN}$ that are generated based on $I_{t1}$, $I_{t2}$, ... $I_{tN}$. Image quality threshold analyzer 112 also generates a reduced image (IR) based on the original image I. The reduced distorted image corresponding to a particular distorted image is a reduced version of the particular distorted image. The reduced image based on the original image is a version of the original image represented using fewer bits of information. The reduction process may be represented as an image reduction function R( ). For example, $R(I_{t1})=IR_{t1}$ and $R(I)=IR$.

In some embodiments, a reduced version of an image is obtained by applying a downsampling process to the image, thereby reducing the size of the resulting image. In this case, R( ) is a downsampling process. Different downsampling processes may be used to reduce the size of the resulting image. In one example, the downsampling process removes one row of the image for every two rows of the image and one column of the image for every two columns of the image. In another example, the downsampling process removes one row of the image for every N rows of the image and one column of the image for every M columns of the image, where N and M are predetermined integers.

In some embodiments, a reduced version of an image is obtained by applying a filtering process, followed by a downsampling process to the image. In this case, R( ) includes a filtering process and a downsampling process. Different filtering processes may be used. In some embodiments, the filtering process includes low-pass filtering. In some embodiments, the filtering process applies an image kernel (also known as a convolution matrix or mask) to apply a blurring effect. A blur kernel is a small matrix and the blurring effect to an image is accomplished by means of convolution between the blur kernel and the image. In some embodiments, the filtering process applies a Gaussian blur (also known as Gaussian smoothing) filter to apply a blurring effect. A Gaussian blur filter is a type of image-blurring filter that uses a Gaussian function for calculating the transformation to apply to each pixel in an image.

At 1308, for each of the plurality of reduced distorted images, image quality threshold analyzer 112 computes the structural similarity metric (SSIM) between the particular reduced distorted image and the reduced version of the original image. For example, the SSIMs are SSIM(IR, $IR_{t1}$), SSIM(IR, $IR_{t2}$), . . . and SSIM(IR, $IR_{tN}$).

At 1310, image quality threshold analyzer 112 computes the VoQS of the original image based on the PSNRs and SSIMs computed at steps 1306 and 1308.

The VoQS of the original image computed by process 1300, Q'(I), is now defined as:

$$Q'(I) \triangleq [q'(I_{t1}, IR_{t1}), q'(I_{t2}, IR_{t2}), \ldots q'(I_{tN}, IR_{tN})] \quad \text{Equation (5)}$$

where

N is the number of level of distortions introduced to image I;

$t_i$ is the percentage threshold of the image size when the initial rendering of the image is performed, and $0 \leq t_i \leq 100\%$;

$I_{t1}, I_{t2}, \ldots I_{tN}$ are the distorted (noisy) versions of image I when only $t_i$ percent of I has been rendered;

$IR_{t1}, IR_{t2}, \ldots IR_{tN}$ are the reduced distorted images generated based on $I_{t1}, I_{t2}, \ldots I_{tN}$.

$q'(I_t, IR_t)$ is the element signature of the image I rendered at t threshold, i.e., $I_t$; and $$q'(I_0, IR_0) \triangleq 0 \text{ and } q'(I_{100}, IR_{100}) \triangleq 1.$$

Using the combination of PSNR and SSIM as the objective measures of perceptual quality, the element signature may be determined as $$q'(I_t, IR_t) = [p(I_t), \text{SSIM}(IR, IR_t)] \quad \text{Equation (6)}$$

Referring back to step 1306 of process 1300, each of the PSNR computations is performed on a distorted image against the original image. However, in some other embodiments, each of the PSNR computations may be performed on a reduced version of a distorted image and a reduced version of the original image; for example, the PSNRs may be PSNR(IR, $IR_{t1}$), PSNR(IR, $IR_{t2}$), . . . and PSNR(IR, $IR_{tN}$).

Referring back to step 1308 of process 1300, the traditional structural similarity (SSIM) index may be used (Z. Wang, A. C. Bovik, H. R. Sheikh, and E. P. Simoncelli, "Image quality assessment: from error visibility to structural similarity," IEEE Trans. Image Process., vol. 13, no. 4, pp. 600-612, April 2004). In some other embodiments, other objective measures of similarity between two images, such as other full-reference similarity metrics, may be used. One example is the feature similarity index (FSIM) proposed by L. Zhang, D. Zhang, X. Mou, and D. Zhang in "FSIM: A feature similarity index for image quality assessment," IEEE Trans. Image Process., vol. 20, no. 8, pp. 2378-2386, August 2011. Another example is the Fast MS-SSIM (M. J. Chen and A. C. Bovik, "Fast structural similarity index algorithm," Journal of Real-Time Image Processing, vol. 6, no. 4, pp. 281-287, 2011).

Referring back to step 1307 of process 1300, image quality threshold analyzer 112 generates a plurality of reduced distorted images based on the plurality of the distorted images. However, it should be recognized that some embodiments may instead generate the plurality of reduced distorted images by introducing different levels of distortion/compression to the already reduced original image.

Referring back to step 1307 of process 1300, image quality threshold analyzer 112 generates a plurality of reduced distorted images based on the plurality of the distorted images. Image quality threshold analyzer 112 also generates a reduced image (IR) based on the original image I. It should be recognized that the greater the reduction in size of the images at step 1307, the lower the computation intensity of the SSIM computations at step 1308. However, too great a reduction in size of the images may cause the reduced images to lose their characteristics, thereby causing the SSIM operations on the reduced images to fail in measuring the similarities between the distorted images and the original image accurately. Accordingly, the amount of reduction of the images in size and the image reduction function R( ) used at step 1307 of process 1300 should be determined such that the computation intensity of the SSIM computations is minimized, while maintaining the SSIM computations as good measures of the similarities between the distorted images and the original image.

Figure 14:
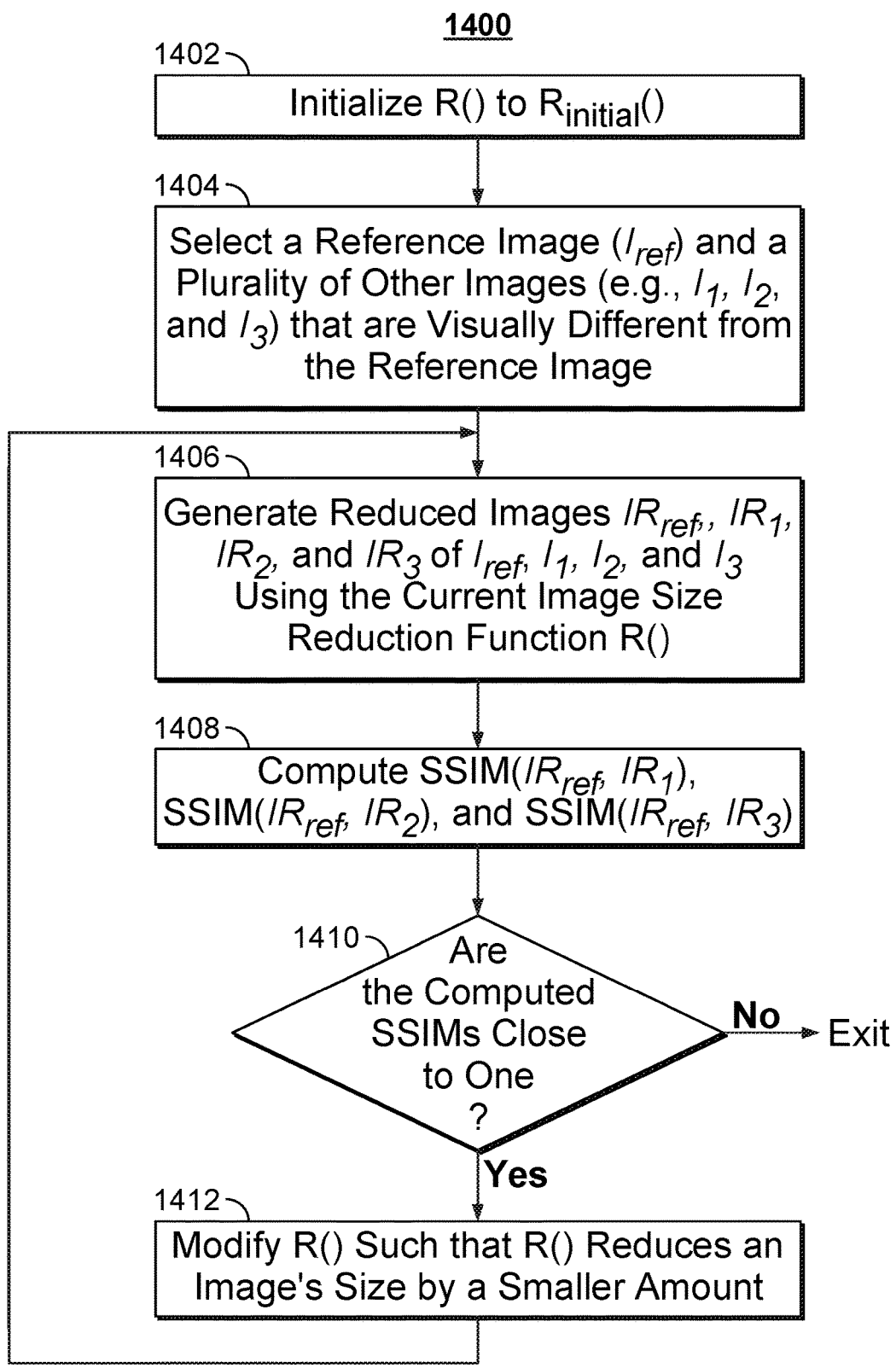
FIG. 14 illustrates one embodiment of a process 1400 for determining the image reduction function R( ) that can be used at step 1307 of process 1300.

Different techniques may be used to determine the image reduction function, RO, and its associated amount of image size reduction. FIG. 14 illustrates one embodiment of a process 1400 for determining the image reduction function R( ) that can be used at step 1307 of process 1300.

At step 1402, image quality threshold analyzer 112 initializes the reduction of the images in size to an initial first level. In particular, R( ) is initialized to $R_{initial}$( ). In some embodiments, the first level is set to a high level of reduction that will likely cause the SSIM operations on the reduced images to fail in measuring the similarities between the distorted images and the original image accurately. For example, the initial first level of reduction is set to reduce the image before any reduction to a small percentage, e.g., 10%, of its original size. In particular, $R_{initial}$( ) reduces an input image to an output image that is 10% of the input image's size. In another example, the initial first level of reduction is set to reduce the image before any reduction to a small predetermined image size, e.g., 50*50 or 100*100 pixels in size. In particular, $R_{initial}$( ) reduces an input image to an output image that looks similar to the input image but is only 50*50 or 100*100 pixels in size.

At 1404, image quality threshold analyzer 112 selects a reference image ($I_{ref}$) and a plurality of other images (e.g., $I_1$, $I_2$, and $I_3$) that are visually different from the reference image. The plurality of other images should also be visually different from each other. In some embodiments, each of the plurality of other images may be selected from a different cluster of images stored in image database 114. For example, each of the plurality of other images may be the exemplar image representing a different cluster of images stored in image database 114.

At 1406, image quality threshold analyzer 112 generates a reduced image, $IR_{ref}$, of $I_{ref}$ using the current image size reduction function R( ). Image quality threshold analyzer 112 also generates the reduced images, $IR_1$, $IR_2$, and $IR_3$ of $I_1$, $I_2$, and $I_3$ using the current image size reduction function R( ).

At 1408, image quality threshold analyzer 112 computes the SSIMs between $IR_{ref}$ and $IR_1$, $IR_2$, and $IR_3$, respectively. In particular, image quality threshold analyzer 112 computes SSIM($IR_{ref}$, $IR_1$), SSIM($IR_{ref}$, $IR_2$), and SSIM($IR_{ref}$, $IR_3$).

At 1410, image quality threshold analyzer 112 determines whether the computed SSIMs obtained at 1408 are all close to the value of one, indicating that the SSIM operations on the reduced images are no longer accurate similarity measures. For example, image quality threshold analyzer 112 determines whether the computed SSIMs obtained at 1408 are each larger than a predetermined threshold value, such as 0.9 or 0.95. If the computed SSIMs are each larger than the predetermined threshold value, then process 1400 proceeds to 1412; otherwise, process 1400 terminates and the image reduction function R( ) that can be used at step 1307 of process 1300 is determined.

At 1412, image quality threshold analyzer 112 modifies R( ) such that the modified R( ) reduces an image's size by a smaller amount. After 1412, process 1400 returns to 1406 and the steps 1406, 1408, 1410, and 1412 are repeated a number of times until the computed SSIMs are no longer close to one and the R( ) that can be used at step 1307 of process 1300 is determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering an image, comprising:
receiving a request for an image;
determining by a processor a variation of quality signature of the image, wherein the variation of quality signature of the image comprises a plurality of element signatures, comprising:
generating a reduced version of the image;
generating a plurality of reduced distorted images, wherein each reduced distorted image is formed by:
applying a different level of distortion to the image, and wherein the different levels of distortion are applied using a single compression algorithm; and
generating a reduced version of the image after the corresponding level of distortion is applied; and
determining the plurality of element signatures, wherein each element signature corresponds to one of the plurality of reduced distorted images, and wherein each element signature measures a degree of similarity between the reduced version of the image and the corresponding reduced distorted image;
categorizing by the processor the image into one of a plurality of clusters of images, wherein the categorization is based on a similarity between the variation of quality signature of the image and one or more other variation of quality signatures of one or more other images within the plurality of clusters of images; and
delivering a distorted version of the image based on the categorization.

2. The method of claim 1, wherein the categorization is based on a similarity between the variation of quality signature of the image and a variation of quality signature of an exemplar image best representing the cluster that the image is categorized into.

3. The method of claim 2, wherein delivering a distorted version of the image based on the categorization comprises:
determining an image quality threshold for the image based on an image quality threshold for the exemplar image best representing the cluster that the image is categorized into; and
generating the distorted version of the image based on the image quality threshold for the image.

4. The method of claim 3, wherein generating the distorted version of the image based on the image quality threshold for the image comprises:
transcoding the image to a different encoding format based on the image quality threshold for the image.

5. The method of claim 3, wherein generating the distorted version of the image based on the image quality threshold for the image comprises:
delivering the image using a partial download mode, wherein an initial rendering of the image is performed after a percentage of the image has been buffered, and wherein the percentage is based on the image quality threshold for the image.

6. The method of claim 1, wherein each element signature comprises:
a peak signal-to-noise ratio (PSNR) of its corresponding reduced distorted image, with the image as a reference.

7. The method of claim 1, wherein each element signature comprises a full-reference similarity metric between one of the plurality of reduced distorted images and the reduced version of the image.

8. The method of claim 7, wherein the full-reference similarity metric is a structural similarity metric (SSIM).

9. The method of claim 1, wherein generating a reduced version of an image comprises low-pass filtering.

10. The method of claim 9, wherein low-pass filtering comprises applying a blur kernel.

11. The method of claim 1, wherein generating a reduced version of an image comprises downsampling.

12. The method of claim 11, wherein downsampling comprises removing rows or columns of pixels.

13. The method of claim 1, further comprising:
determining an image reduction function, wherein the image reduction function is used to generate the reduced version of the image and wherein the image reduction function is used to generate the plurality of reduced distorted images, and wherein the image reduction function is determined based on whether a SSIM between a first reduced image and a second reduced image provides a substantially accurate measure of a similarity between a first image and a second image, wherein the first reduced image is generated by the image reduction function based on the first image, and wherein the second reduced image is generated by the image reduction function based on the second image.

14. The method of claim 13, further comprising:
modifying the image reduction function to provide less reduction in the event that the SSIM between the first reduced image and the second reduced image is determined as not a substantially accurate measure of a similarity between the first image and the second image.

15. The method of claim 1, wherein the plurality of clusters of images is categorized into clusters based on similarities among the variation of quality signatures of the plurality of clusters of images.

16. The method of claim 1, wherein a similarity between two variation of quality signatures is based on a Euclidean distance between the two variation of quality signatures.

17. The method of claim 1, further comprising selecting an exemplar image that best represents each cluster of images, and wherein the exemplar image has a variation of quality signature that is closest to all the other images in the cluster.

18. The method of claim 17, further comprising determining an image quality threshold for delivering each exemplar image.

19. A system for delivering an image, comprising:
a processor; and
a memory coupled with the processor, wherein the memory is configured to provide the processor with instructions which when executed cause the processor to:
receive a request for an image;
determine a variation of quality signature of the image, wherein the variation of quality signature of the image comprises a plurality of element signatures, comprising:
generating a reduced version of the image;
generating a plurality of reduced distorted images, wherein each reduced distorted image is formed by:
applying a different level of distortion to the image, and wherein the different levels of distortion are applied using a single compression algorithm; and
generating a reduced version of the image after the corresponding level of distortion is applied; and
determining the plurality of element signatures, wherein each element signature corresponds to one of the plurality of reduced distorted images, and wherein each element signature measures a degree of similarity between the reduced version of the image and the corresponding reduced distorted image; and
categorize the image into one of a plurality of clusters of images, wherein the categorization is based on a similarity between the variation of quality signature of the image and one or more other variation of quality signatures of one or more other images within the plurality of clusters of images; and
deliver a distorted version of the image based on the categorization.

20. The system of claim 19, wherein the categorization is based on a similarity between the variation of quality signature of the image and a variation of quality signature of an exemplar image best representing the cluster that the image is categorized into.

21. The system of claim 20, wherein delivering a distorted version of the image based on the categorization comprises:
determining an image quality threshold for the image based on an image quality threshold for the exemplar image best representing the cluster that the image is categorized into; and
generating the distorted version of the image based on the image quality threshold for the image.

22. The system of claim 21, wherein generating the distorted version of the image based on the image quality threshold for the image comprises:
transcoding the image to a different encoding format based on the image quality threshold for the image.

23. The system of claim 21, wherein generating the distorted version of the image based on the image quality threshold for the image comprises:
delivering the image using a partial download mode, wherein an initial rendering of the image is performed after a percentage of the image has been buffered, and wherein the percentage is based on the image quality threshold for the image.

24. The system of claim 19, wherein each element signature comprises:
a peak signal-to-noise ratio (PSNR) of its corresponding reduced distorted image, with the image as a reference.

25. The system of claim 19, wherein each element signature comprises a full-reference similarity metric between one of the plurality of reduced distorted images and the reduced version of the image.

26. The system of claim 25, wherein the full-reference similarity metric is a structural similarity metric (SSIM).

27. The system of claim 19, wherein generating a reduced version of an image comprises low-pass filtering.

28. The system of claim 27, wherein low-pass filtering comprises applying a blur kernel.

29. The system of claim 19, wherein generating a reduced version of an image comprises downsampling.

30. The system of claim 29, wherein downsampling comprises removing rows or columns of pixels.

31. The system of claim 19, wherein the memory is further configured to provide the processor with instructions which when executed cause the processor to:
determine an image reduction function, wherein the image reduction function is used to generate the reduced version of the image and wherein the image reduction function is used to generate the plurality of reduced distorted images, and wherein the image reduction function is determined based on whether a SSIM between a first reduced image and a second reduced image provides a substantially accurate measure of a similarity between a first image and a second image, wherein the first reduced image is generated by the image reduction function based on the first image, and wherein the second reduced image is generated by the image reduction function based on the second image.

32. The system of claim 31, wherein the memory is further configured to provide the processor with instructions which when executed cause the processor to:
modify the image reduction function to provide less reduction in the event that the SSIM between the first reduced image and the second reduced image is determined as not a substantially accurate measure of a similarity between the first image and the second image.

33. The system of claim 19, wherein the plurality of clusters of images is categorized into clusters based on similarities among the variation of quality signatures of the plurality of clusters of images.

34. The system of claim 19, wherein a similarity between two variation of quality signatures is based on a Euclidean distance between the two variation of quality signatures.

35. The system of claim 19, wherein the memory is further configured to provide the processor with instructions which when executed cause the processor to:
select an exemplar image that best represents each cluster of images, and wherein the exemplar image has a variation of quality signature that is closest to all the other images in the cluster.

36. The system of claim 35, wherein the memory is further configured to provide the processor with instructions which when executed cause the processor to:
determine an image quality threshold for delivering each exemplar image.

37. A computer program product for delivering an image, the computer program product being embodied in a non-transitory tangible computer readable storage medium and comprising computer instructions for:
receiving a request for an image;
determining by a processor a variation of quality signature of the image, wherein the variation of quality signature of the image comprises a plurality of element signatures, comprising:

generating a reduced version of the image;
generating a plurality of reduced distorted images, wherein each reduced distorted image is formed by:
applying a different level of distortion to the image, and wherein the different levels of distortion are applied using a single compression algorithm; and
generating a reduced version of the image after the corresponding level of distortion is applied; and
determining the plurality of element signatures, wherein each element signature corresponds to one of the plurality of reduced distorted images, and wherein each element signature measures a degree of similarity between the reduced version of the image and the corresponding reduced distorted image;
categorizing by the processor the image into one of a plurality of clusters of images, wherein the categorization is based on a similarity between the variation of quality signature of the image and one or more other variation of quality signatures of one or more other images within the plurality of clusters of images; and
delivering a distorted version of the image based on the categorization.

* * * * *

UNITED STATES PATENT AND TRADEMARK OFFICE
CERTIFICATE OF CORRECTION

PATENT NO.         : 10,015,503 B1
APPLICATION NO.    : 15/270956
DATED              : July 3, 2018
INVENTOR(S)        : Parvez Ahammad Page 1 of 1

It is certified that error appears in the above-identified patent and that said Letters Patent is hereby corrected as shown below:

In Page 2, Item (56), References Cited, Other Publications, Cite No. 13, delete:
"Chandra et al., Differentiated Multimedia Web Services Using Quality Aware Transcoding, Proceedings of the Nineteenth Annual Joint Conference of the IEEE Computer and Communications Societies (INFOCOM), 2000, pp. 361-969."

And insert:
--Chandra et al., Differentiated Multimedia Web Services Using Quality Aware Transcoding, Proceedings of the Nineteenth Annual Joint Conference of the IEEE Computer and Communications Societies (INFOCOM), 2000, pp. 961-969.--, therefor.

Signed and Sealed this
Twenty-seventh Day of November, 2018

Andrei Iancu
*Director of the United States Patent and Trademark Office*